United States Patent
Son et al.

(10) Patent No.: US 12,243,690 B2
(45) Date of Patent: Mar. 4, 2025

(54) MULTILAYER CAPACITOR

(71) Applicant: SAMSUNG ELECTRO-MECHANICS CO., LTD., Suwon-si (KR)

(72) Inventors: Won Su Son, Suwon-si (KR); Ki Pyo Hong, Suwon-si (KR); Eun Jong Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 145 days.

(21) Appl. No.: 18/077,512

(22) Filed: Dec. 8, 2022

(65) Prior Publication Data
US 2023/0207200 A1    Jun. 29, 2023

(30) Foreign Application Priority Data

Dec. 28, 2021  (KR) .................. 10-2021-0189813
Jun. 2, 2022   (KR) .................. 10-2022-0067673

(51) Int. Cl.
*H01G 4/12*   (2006.01)
*H01G 4/224*  (2006.01)
*H01G 4/232*  (2006.01)

(52) U.S. Cl.
CPC .............. *H01G 4/12* (2013.01); *H01G 4/224* (2013.01); *H01G 4/232* (2013.01)

(58) Field of Classification Search
None
See application file for complete search history.

(56) References Cited

U.S. PATENT DOCUMENTS

| | | | |
|---|---|---|---|
| 2006/0279903 A1 | 12/2006 | Togashi et al. | |
| 2012/0262840 A1* | 10/2012 | Koizumi | H01G 4/12 361/321.2 |
| 2014/0104750 A1 | 4/2014 | Ahn et al. | |
| 2016/0027584 A1* | 1/2016 | Hattori | H01G 4/224 361/301.4 |
| 2016/0381802 A1* | 12/2016 | Taniguchi | H01G 4/008 174/260 |
| 2018/0035545 A1 | 2/2018 | Lee et al. | |
| 2020/0118746 A1* | 4/2020 | Matsui | H01G 4/012 |
| 2020/0152384 A1* | 5/2020 | Sasaki | H01G 4/012 |
| 2021/0090801 A1* | 3/2021 | Sawada | H01G 4/2325 |

FOREIGN PATENT DOCUMENTS

| | | |
|---|---|---|
| JP | 2006-351642 A | 12/2006 |
| KR | 10-1376839 B1 | 3/2014 |
| KR | 10-2018-0012629 A | 2/2018 |

* cited by examiner

*Primary Examiner* — Eric W Thomas
(74) *Attorney, Agent, or Firm* — MORGAN, LEWIS & BOCKIUS LLP

(57) ABSTRACT

A multilayer capacitor includes an active portion including a dielectric layer and first and second internal electrodes stacked with the dielectric layer interposed therebetween in a first direction, a first external electrode covering the active portion and connected to the first internal electrode, a connection electrode covering the active portion and connected to the second internal electrode, a side margin portion covering the connection electrodes on the active portion, and a second external electrode covering the side margin portions and connected to the connection electrode.

43 Claims, 26 Drawing Sheets

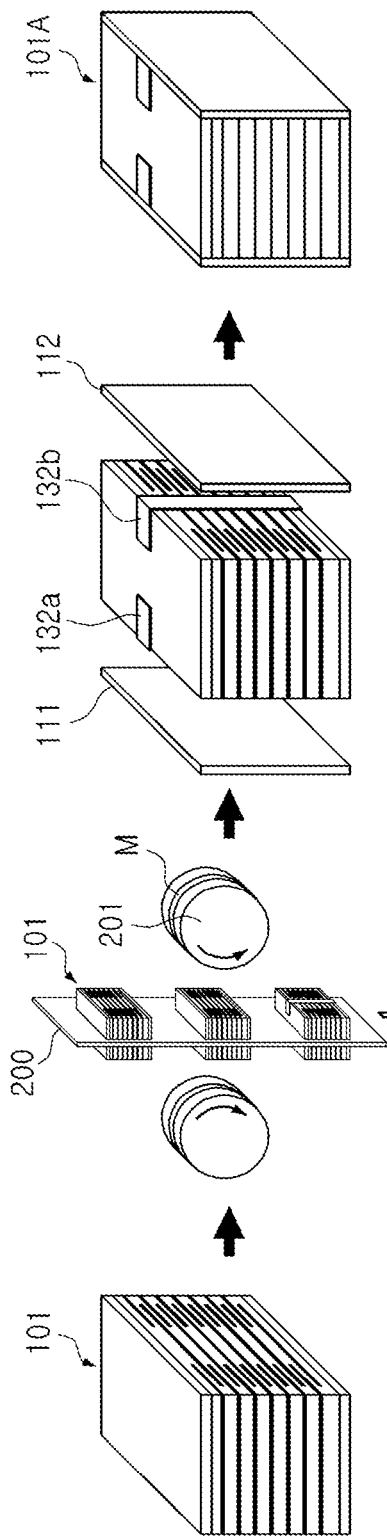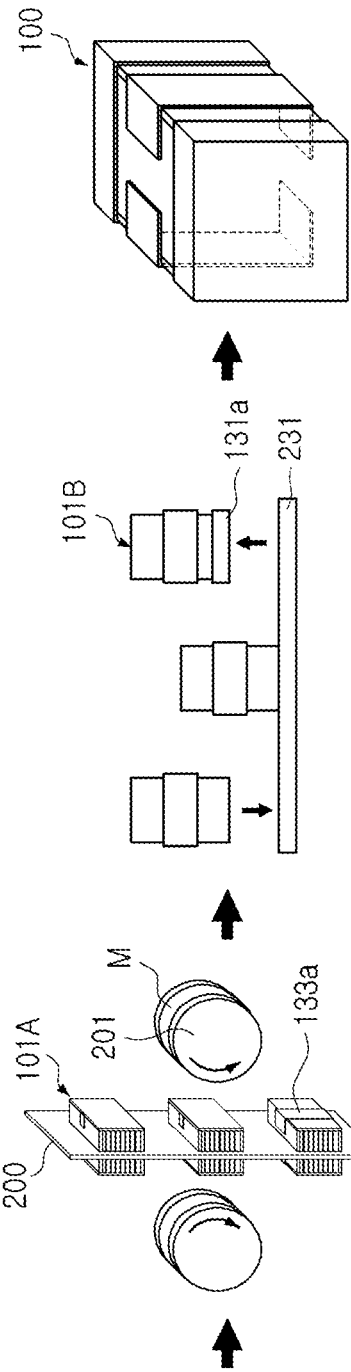

MULTILAYER CAPACITOR

CROSS-REFERENCE TO RELATED APPLICATION(S)

This application claims benefit of priority to Korean Patent Application Nos. 10-2021-0189813 filed on Dec. 28, 2021 and 10-2022-0067673 filed on Jun. 2, 2022 in the Korean Intellectual Property Office, the disclosure of which is incorporated herein by reference in its entirety.

TECHNICAL FIELD

The present disclosure relates to a multilayer capacitor.

BACKGROUND

A capacitor is an element that may store electricity, and basically, when two electrodes are opposed to each other and a voltage is applied thereto, electricity is accumulated in each electrode. When a DC voltage is applied, a current flows inside the capacitor as electricity is stored, but when the accumulation is completed, the current stops flowing. Meanwhile, when an AC voltage is applied, an AC current flows while polarities of the electrodes are changed.

According to the types of insulators provided between electrodes, capacitors may be classified as several types of capacitor, such as an aluminum electrolytic capacitor including electrodes formed of aluminum and a thin oxide between the aluminum electrodes, a tantalum capacitor using tantalum as an electrode material, a ceramic capacitor using a high-κ dielectric such as titanium barium between the electrodes, a multilayer ceramic capacitor (MLCC) using a high-κ ceramic as a dielectric provided between the electrodes in a multilayer structure, and a film capacitor using a polystyrene film as a dielectric between the electrodes.

Thereamong, multilayer ceramic capacitors having excellent temperature and frequency characteristics and implemented to have a compact size have been commonly applied in various fields such as high frequency circuits or the like. Recently, attempts have been made to implement smaller multilayer ceramic capacitors, and to this end, a dielectric layer, internal electrodes, and external electrodes are thinly formed.

SUMMARY

Exemplary embodiments provide a multilayer capacitor having improved capacitance.

Exemplary embodiments provide a multilayer capacitor having improved structural stability.

Exemplary embodiments provide a multilayer capacitor having improved moisture resistance reliability.

According to an aspect of the present disclosure, a multilayer capacitor includes: an active portion including a dielectric layer and first and second internal electrodes stacked with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode covering the third and fourth surfaces of the active portion and connected to the first internal electrode; a connection electrode covering the fifth and sixth surfaces of the active portion and connected to the second internal electrode; a side margin portion covering the connection electrode on the fifth surface and the sixth surface of the active portion; and a second external electrode covering the side margin portions on the fifth surface and the sixth surface of the active portion and connected to the connection electrode.

Each of the first external electrode, the connection electrode, and the second external electrode may be provided as a pair.

The pair of second external electrodes may cover the fifth and sixth surfaces of the active portion and may extend to the first and second surfaces, respectively.

The pair of second external electrodes may cover the first surface and the second surface of the active portion and may extend to the fifth surface and the sixth surface, respectively.

The active portion may have a length in the first direction longer than a length in the second direction.

A length of the side margin portion in the second direction may be longer than a length of the connection electrode in the second direction.

A length of the second external electrode in the second direction may be longer than the length of the connection electrode in the second direction.

A length of the second external electrode in the second direction may be shorter than a length of the side margin portion in the second direction.

The second external electrode may have a ring shape covering the first surface, the second surface, the fifth surface, and the sixth surface of the active portion.

The connection electrode may have a ring shape covering the first surface, the second surface, the fifth surface, and the sixth surface of the active portion.

The connection electrode may extend to the first surface and the second surface of the active portion, and the connection electrode and the second external electrode may be connected to each other in the first surface and the second surface of the active portion.

The multilayer capacitor may further include at least one conductive via passing through the side margin to connect the connection electrode to the second external electrode.

The dielectric layer and the side margin portion may include first and second ceramic sintered bodies, respectively, and the first and second ceramic sintered bodies may have different average grain sizes.

A difference between the average grain sizes of the first and second ceramic sintered bodies may be 5% or greater.

The difference between the average grain sizes of the first and second ceramic sintered bodies may be less than 5%. Size distributions of the grains included in the first and second ceramic sintered bodies may be first and second distributions, respectively, and a standard deviation of the first and second distributions may be equal to or greater than 10%.

The dielectric layer and the side margin portion may include first and ceramic second sintered bodies, respectively, and the colors of the first and second ceramic sintered bodies may be different from each other.

A difference in gray level of images obtained from cross-sections of the first and second ceramic sintered bodies may be 10 levels or greater.

The first internal electrode may extend to the third surface and the fourth surface of the active portion.

The first internal electrode may extend to the fifth surface and the sixth surface of the active portion.

The first internal electrode may have a plurality of protrusions extending to the fifth and sixth surfaces of the active portion.

The plurality of protrusions in the first internal electrode may have side surfaces inclined with respect to the third to sixth surfaces of the active portion.

A region corresponding to the inclined side surface of the first internal electrode may not overlap the second internal electrode in the first direction.

The connection electrode may be disposed in a region between the plurality of protrusions.

The second internal electrode may extend to the fifth and sixth surfaces of the active portion.

A width, in the second direction, of a region extending from the second internal electrode to the fifth surface and the sixth surface of the active portion may be wider than a width of the connection electrode in the second direction.

The second internal electrode may have a flat plate shape.

The second internal electrode may have a plurality of protrusions extending to the fifth and sixth surfaces.

The connection electrode may be disposed in a recess in the side margin portion.

According to another aspect of the present disclosure, a multilayer capacitor includes: an active portion including a dielectric layer and first and second internal electrodes stacked with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode covering the third and fourth surfaces of the active portion and connected to the first internal electrode; a connection electrode covering the fifth and sixth surfaces of the active portion and connected to the second internal electrode; a side margin portion covering the fifth surface and the sixth surface of the active portion and having a plurality of separated regions; and a second external electrode covering the side margin portion on the fifth surface and sixth surface of the active portion and connected to the connection electrode.

According to another aspect of the present disclosure, a multilayer capacitor includes: an active portion including a dielectric layer and a plurality of internal electrodes stacked with the dielectric layer interposed therebetween; a connection electrode covering at least one surface of the active portion and connected to the plurality of internal electrodes; an insulating portion covering the connection electrode and having a length measured in a width direction, parallel to the one surface and perpendicular to a stacking direction of the plurality of internal electrodes, longer than the connection electrode; and an external electrode covering the insulating portion and connected to the connection electrode.

A length of the external electrode in the width direction may be longer than a length of the connection electrode in the width direction.

The length of the external electrode in the width direction may be less than the insulating portion in the width direction.

According to another aspect of the present disclosure, a multilayer capacitor includes: an active portion including a dielectric layer and first and second internal electrodes stacked with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction, wherein the first internal electrode extends to the third surface and one or more of the fifth surface and the sixth surface, and the second internal electrode extends to the one or more of the fifth surface and the sixth surface; a first external electrode disposed on the third surface of the active portion and connected to the first internal electrode; a connection electrode disposed on the one or more of the fifth surface and the sixth surface of the active portion and connected to the second internal electrode; a second external electrode disposed on the one or more of the fifth surface and the sixth surface of the active portion and connected to the connection electrode; and a side margin portion disposed on the one or more of the fifth surface and the sixth surface of the active portion to cover at least one of a portion of the first internal electrode and a portion of the second internal electrode.

The first internal electrode may extend to the fourth surface, and the multilayer capacitor may further include a third external electrode disposed on the fourth surface of the active portion and connected to the first internal electrode.

The connection electrode may extend to cover a portion of one or more of the first and second surfaces of the active portion.

The connection electrode may extend continuously from the fifth surface to the sixth surface of the body to cover the portion of the one or more of the first and second surfaces of the active portion.

The second external electrode may extend to cover a portion of one or more of the first and second surfaces of the active portion.

The second external electrode may extend continuously from the fifth surface to the sixth surface of the body to cover the portion of the one or more of the first and second surfaces of the active portion.

The dielectric layer and the side margin portion may have different average grain sizes.

According to another aspect of the present disclosure, a multilayer capacitor includes: a body including a dielectric layer and first and second internal electrodes stacked with the dielectric layer interposed therebetween; a first external electrode disposed on one surface of the body and connected to the first internal electrode; a connection electrode partially embedded in the body and connected to the second internal electrode; a second external electrode disposed on the body to connect to the connection electrode; and a third external electrode disposed on another surface of the body opposing the one surface and connected to the first internal electrode. In a direction perpendicular to a direction in which the one surface and the another surface of the body oppose each other, a dimension of a portion of the connection electrode embedded in the body is less than a dimension of another portion of the connection electrode disposed on a surface of the body.

The connection electrode may extend to cover a portion of one or more of the first and second surfaces of the active portion.

The connection electrode may extend continuously from the fifth surface to the sixth surface of the body to cover the portion of the one or more of the first and second surfaces of the active portion.

The another portion of the connection electrode may protrude from surface of the body and may be bent from the portion of the connection electrode embedded in the body.

BRIEF DESCRIPTION OF DRAWINGS

The above and other aspects, features, and advantages of the present disclosure will be more clearly understood from the following detailed taken description, in conjunction with the accompanying drawings, in which:

FIGS. 8A-8G illustrate an example of a process of manufacturing a multilayer capacitor;

DETAILED DESCRIPTION

Figure 1:
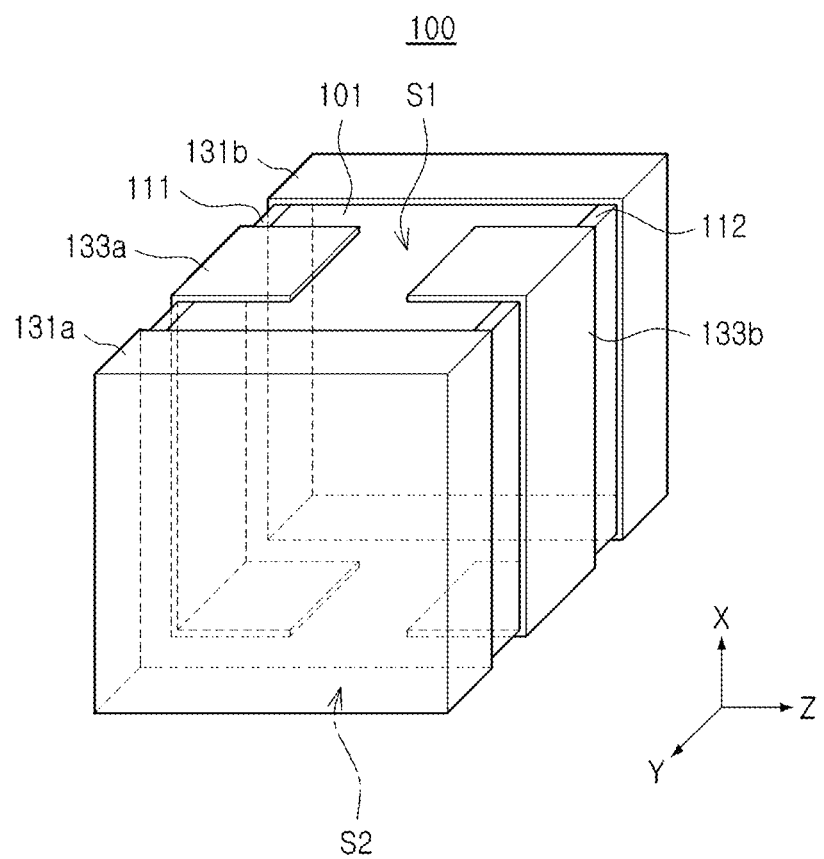
FIGS. 1 and 2 schematically illustrate an exterior of a multilayer capacitor according to an exemplary embodiment in the present disclosure, and correspond to a perspective view and an exploded perspective view, respectively.

Hereinafter, exemplary embodiments of the present inventive concept will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations such as "comprises" or "comprising", will be understood to imply the inclusion of stated elements but not the exclusion of any other elements.

Figure 2:
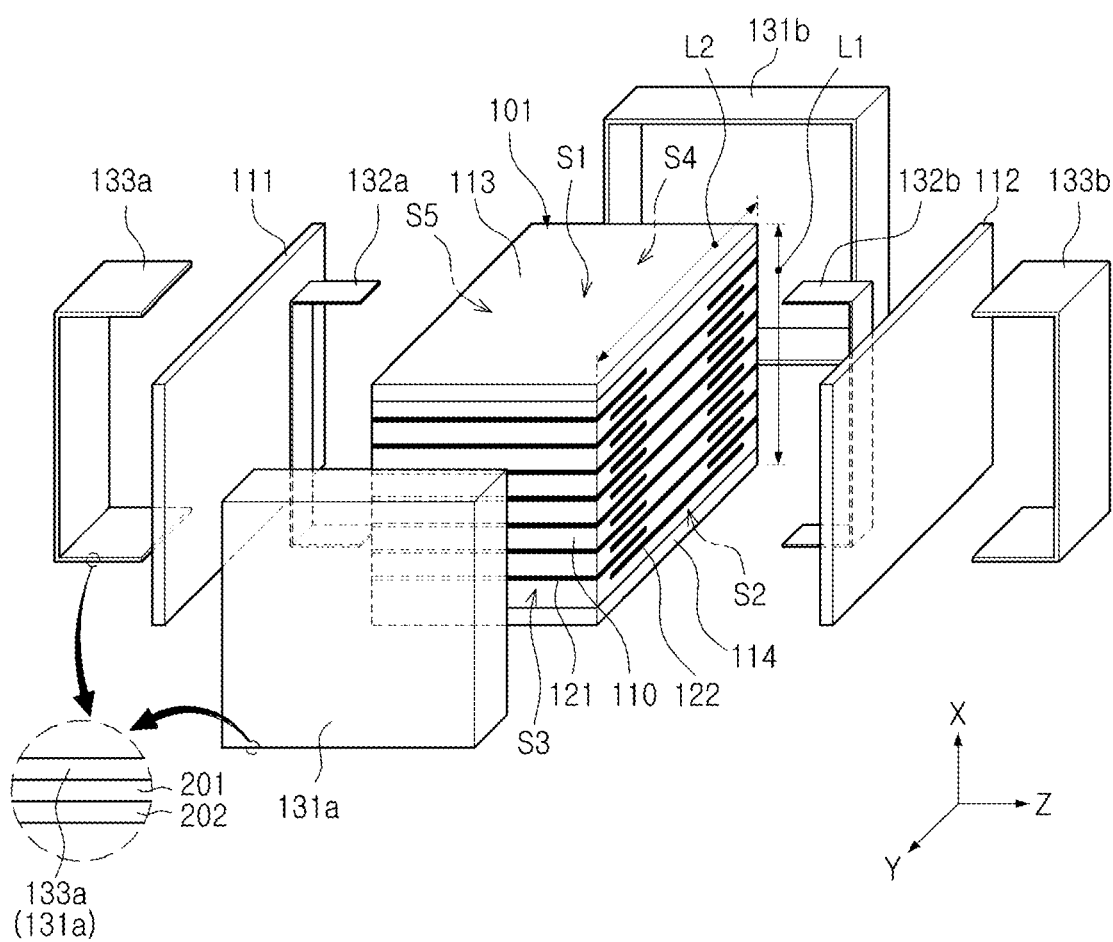
Figure 3:
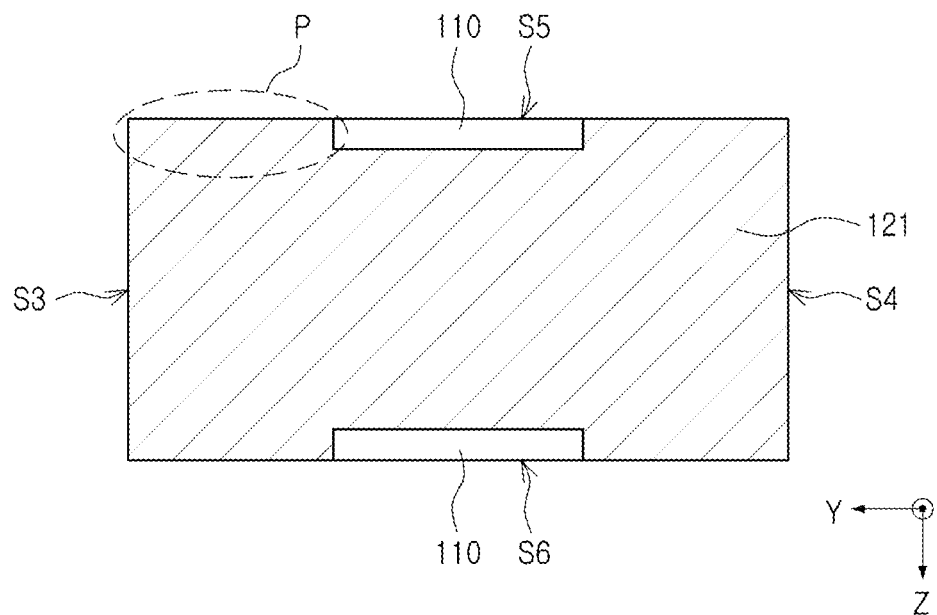
FIGS. 3 and 4 are plan views illustrating a first internal electrode and a second internal electrode, respectively.
Figure 4:
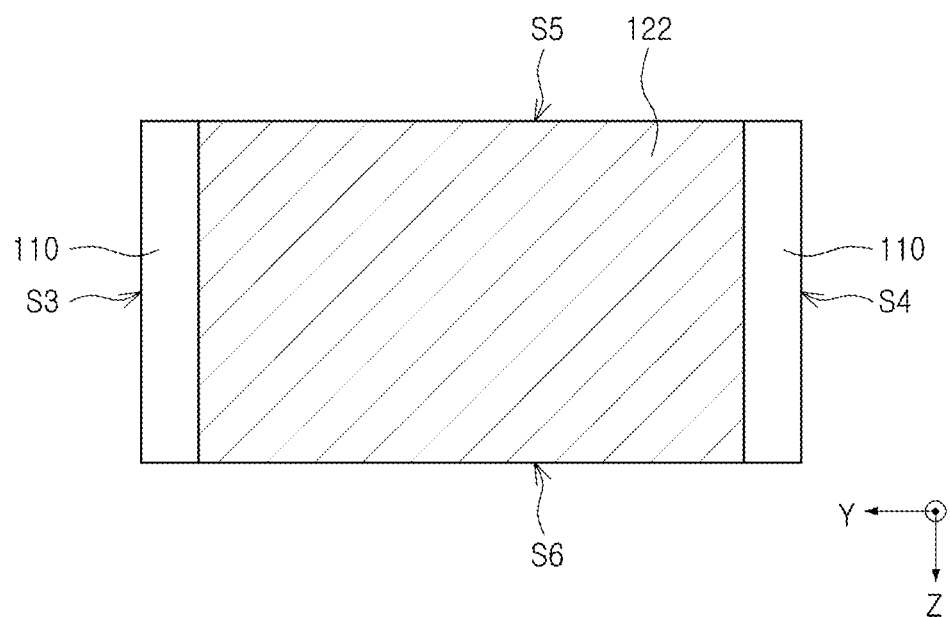
Figure 5:
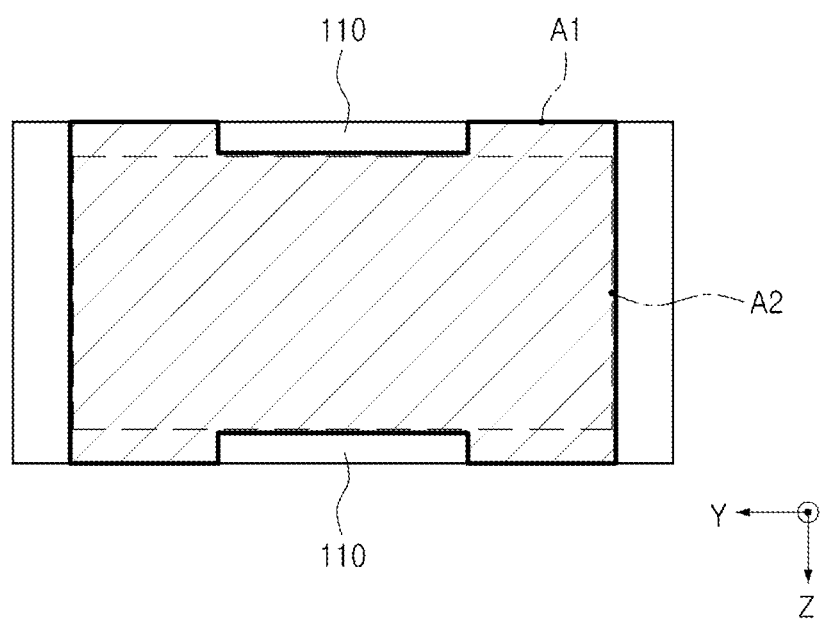
FIG. 5 is a view illustrating an overlapping region of the internal electrodes of FIGS. 3 and 4 as compared with an example of the related art.
Figure 6A:
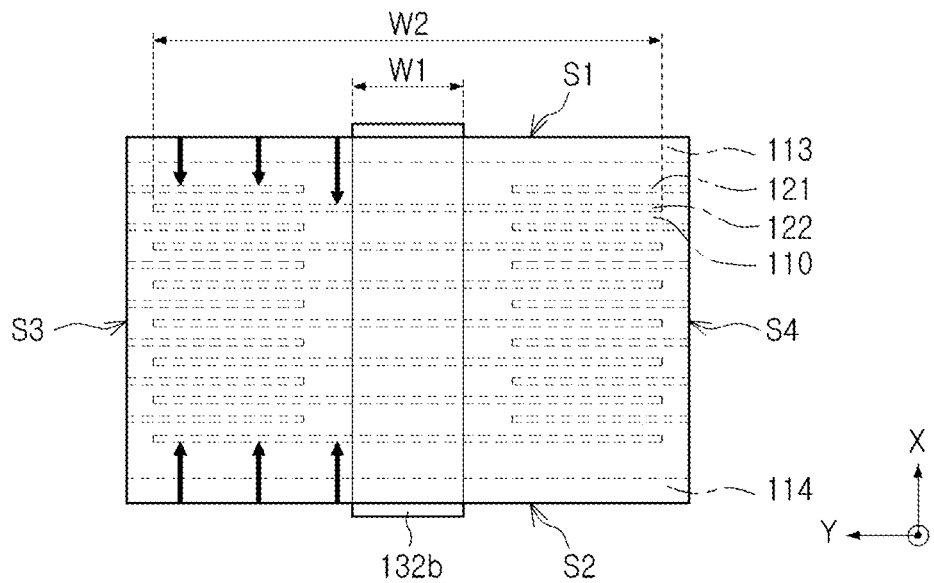
FIGS. 6A-6C are plan views illustrating a region of a multilayer capacitor in Example (FIG. 6A) and Comparative Examples (FIGS. 6B and 6C) of the present disclosure.
Figure 6B:
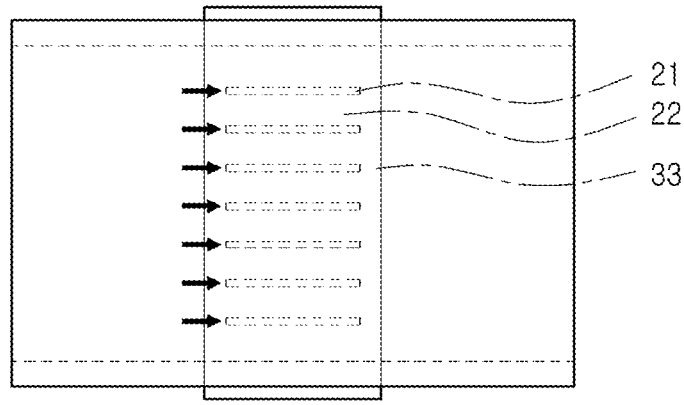
Figure 6C:
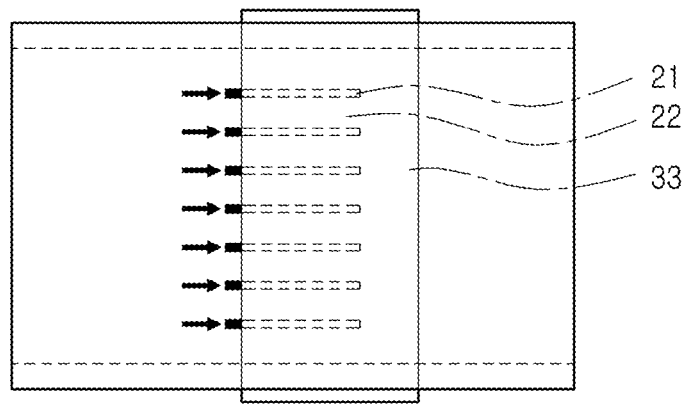

FIGS. 1 and 2 schematically illustrate an exterior of a multilayer capacitor according to an exemplary embodiment in the present disclosure, and correspond to a perspective view and an exploded perspective view, respectively. FIGS. 3 and 4 are plan views illustrating a first internal electrode and a second internal electrode, respectively, and FIG. 5 is a view illustrating an overlapping region of the internal electrodes of FIGS. 3 and 4 compared with the example of the related art. FIGS. 6A-6C are plan views illustrating a region of a multilayer capacitor in Example (FIG. 6A) and Comparative Examples (FIGS. 6B and 6C) of the present disclosure.

First, referring to FIGS. 1 to 4, a multilayer capacitor 100 according to an exemplary embodiment in the present disclosure includes an active portion 101, first external electrodes 131a and 131b, connection electrodes 132a and 132b, side margin portions 111 and 112, and second external electrodes 133a and 133b. Here, the connection electrodes 132a and 132b are connected to the second internal electrode 122, while covering the active portion 101, and the second external electrodes 133a and 133b are connected to the connection electrodes 132a and 132b, while covering the side margin portions 111 and 112.

The active portion 101 includes a dielectric layer 110 and first and second internal electrodes 121 and 122 stacked in a first direction (the X-direction) with the dielectric layer 110 interposed therebetween. In terms of shape, the active portion 101 includes a first surface S1 and a second surface S2 opposing each other in the first direction (the X-direction), a third surface S3 and a fourth surface S4 connected to the first surface S1 and the second surface S2 and opposing each other in a second direction (a Y-direction), and a fifth surface S5 and a sixth surface S6 connected to the first to fourth surfaces S1, S2, S3, and S4 and opposing each other in the third direction (a Z-direction). Here, the first direction (the X-direction), the second direction (the Y-direction), and the third direction (the Z-direction) may be perpendicular to each other. The fact that the surfaces of the active portion 101 are connected to each other includes not only being physically directly connected, but also connected to each other by other elements of the active portion 101. In addition, the active portion 101 may be substantially equal to a length L1 in the first direction (the X-direction) and a length L2 in the second direction (the Y-direction), which may sufficiently secure a stacking number of the internal electrodes 121 and 122 to improve capacitance. The active portion 101 may include cover layers 113 and 114 disposed at the top and bottom, and having a structure in which one or more dielectric layers 110 are stacked. In this case, an average thickness of the cover layers 113 and 114 may not be particularly limited. However, in order to improve capacitance per unit volume of the multilayer capacitor 100, the average thickness of the cover layers 113 and 114 may be 15 µm or less and may be an average value of values measured at five points of each of the upper cover layer 113 and the lower cover layer 114 equally spaced apart from each other.

Although the specific shape of the active portion 101 is not particularly limited, the active portion 101 may have a hexahedral shape or a shape similar thereto as illustrated. Due to the shrinkage of ceramic powder included in the active portion 101 during a sintering process, the active portion 101 may not have a perfectly straight hexahedral shape but may have a substantially hexahedral shape. The dielectric layer 110 included in the active portion 101 is in a sintered state, and adjacent dielectric layers 110 may be integrated such that boundaries therebetween may not be readily apparent without using a scanning electron microscope (SEM). A raw material for forming the dielectric layer 110 is not particularly limited as long as sufficient capacitance may be obtained therewith. For example, a barium titanate-based material, a lead composite perovskite-based material, or a strontium titanate-based material may be used. The barium titanate-based material may include $BaTiO_3$-based ceramic powder, and examples of the ceramic powder may include $BaTiO_3$ and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), or $Ba(Ti_{1-y}Zr_y)O_3$ (0<y<1) in which Ca, Zr, etc. is partially dissolved in $BaTiO_3$. In addition, as a raw material for forming the dielectric layer 110, various ceramic additives, organic solvents, binders, dispersants, etc. may be added to powder such as barium titanate ($BaTiO_3$) according to the purpose of the present disclosure.

An average thickness of the dielectric layer 110 may not be particularly limited. For example, the average thickness of the dielectric layer 110 may be 0.2 µm or more and 10 µm or less. The average thickness of the dielectric layer 110 may refer to an average thickness of the dielectric layer 110 disposed between the first and second internal electrodes 121 and 122. The average thickness of the dielectric layer 110 may be measured by scanning an image of a cross-section (e.g., an X-Y cross-section) of the active portion 101 with a scanning electron microscope at a magnification of 10,000. More specifically, the average value may be measured by measuring the thicknesses of one dielectric layer 110 at 30 points at equal intervals in the second direction (the Y-direction) in the scanned image. In addition, if the average value is measured by extending the measurement of the average value to 10 dielectric layers 110, the average thickness of the dielectric layer may be further generalized.

The first and second internal electrodes 121 and 122 may be obtained by printing a paste containing a conductive metal (e.g., Ni, Ag, Cu, Ti, Pd, Pt, Sn, etc.) to have a predetermined thickness on one surface of the ceramic green sheet by a method such as a screen-printing method or a gravure printing method and then sintering the printed paste. Meanwhile, an average thickness of the first and second internal electrodes 121 and 122 may not be particularly limited. For example, the average thickness of the first and second internal electrodes 121 and 122 may be 0.2 µm or more and 3 µm or less. The average thickness of the first and second internal electrodes 121 and 122 may be measured by scanning an image of a cross-section (e.g., an X-Y cross-section) of the active portion 101 with a scanning electron microscope at a magnification of 10,000. More specifically, the average value may be measured by measuring the thicknesses of one internal electrode at 30 equal intervals in a longitudinal direction in the scanned image. In addition, if the average value is measured by extending the measurement of the average value to 10 internal electrodes 121 and 122, the average thickness of the internal electrodes 121 and 122 may be further generalized.

As illustrated, the first internal electrode 121 may extend to the third surface S3 and the fourth surface S4 of the active portion 101 to be connected to the first external electrodes 131a and 131b. Also, the first internal electrode 121 may extend to the fifth surface S5 and the sixth surface S6 of the active portion 101. As a specific example, as illustrated in FIG. 3, the first internal electrode 121 may have a plurality of protrusions P extending to the fifth surface S5 and the sixth surface S6 of the active portion 101, and accordingly, the first internal electrode 121 may have a shape similar to the letter 'H'. The second internal electrode 122 may extend to the fifth surface S5 and the sixth surface S6 of the active portion 101 to be connected to the connection electrodes 132a and 132b. In this case, like the shape as illustrated in FIG. 4, the second internal electrode 122 may have a flat plate shape. The second internal electrode 121 may be spaced apart from the third surface S3 and the fourth surface S4 of the active portion 101. Also, the connection electrodes 132a and 132b may be disposed in a region between the plurality of protrusions P.

Figure 10A:
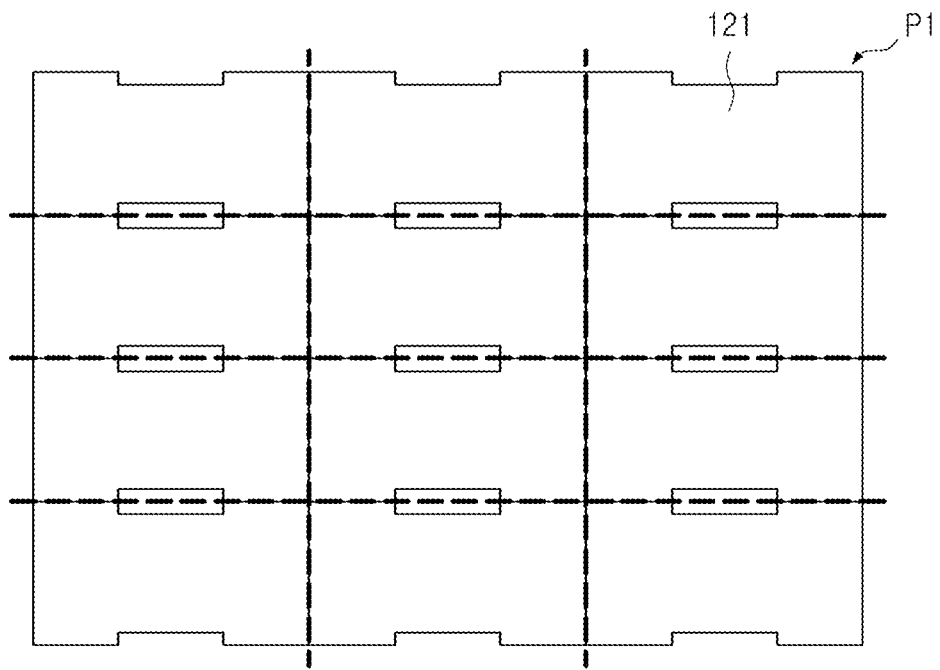
FIGS. 10A to 18B illustrate a process of cutting and individualizing patterns for internal electrodes and shapes of internal electrodes obtainable therefrom.
Figure 10B:
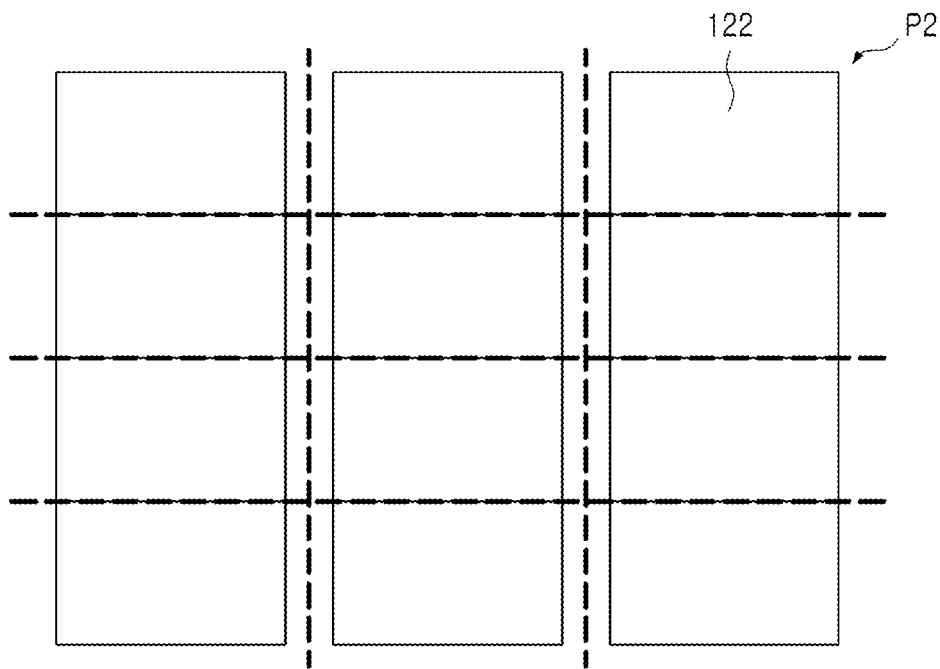
Figure 11:
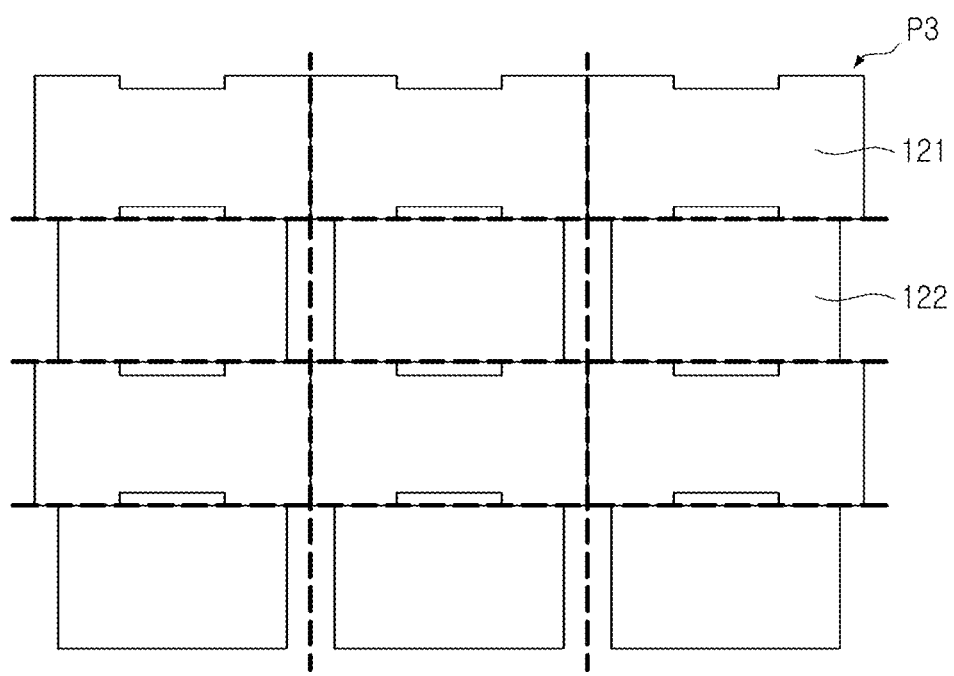
Figure 28:
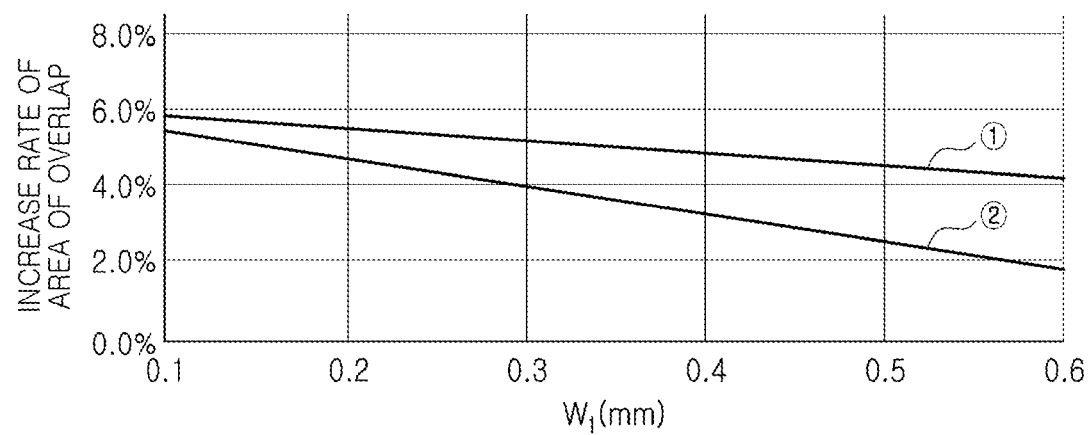
FIG. 28 is a graph illustrating an increase rate of an area of overlap of first and second internal electrodes according to a width W1 of a connection electrode.

Such shapes of the first and second internal electrodes 121 and 122 may increase an area of overlap therebetween in the first direction (the X-direction), thereby improving capacitance. That is, referring to FIG. 5, in the present exemplary embodiment, area A1 in which the first and second internal electrodes 121 and 122 overlap in the first direction (the X-direction) is indicated by the solid line, and area A2 of overlap in the related art is indicated by the dotted line. Based on parts having the same size, A1 has an area increased more than A2, from which the capacitance may be improved. The area of overlap of the first and second internal electrodes 121 and 122 may be increased by employing the side margin portions 111 and 112 as will be described later, thereby minimizing the margins of the first and second internal electrodes 121 and 122 (a distance away from the outside). Furthermore, as the margins of the first and second internal electrodes 121 and 122 are reduced, a step difference problem that may arise in the process of stacking the first and second internal electrodes 121 and 122 may be minimized, which may lead to improved structural stability and reliability of the multilayer capacitor 100. FIG. 28 illustrates an increase rate of an area of overlap of the first and second internal electrodes according to a width W1 of the connection electrode. Here, the increase rate of the area of overlap is compared with the related art case (having the area A2 in FIG. 5), and ① corresponds to a case in which the first and second internal electrodes 121 and 122 are manufactured in two patterns P1 and P2 as illustrated in FIGS. 10A and 10B, while ② corresponds to a case in which the first and second internal electrodes 121 and 122 are manufactured using one pattern P3 as illustrated in FIG. 11. As can be seen from the results of the graph of FIG. 28, the area of overlap could be increased as compared to the related art by adopting the present exemplary embodiment, in which, the reason why the increase rate slows down as the width W1 of the connection electrode increases is because the width of the protrusion P of the first internal electrode 121 is reduced.

The first external electrodes 131a and 131b cover the third surface S3 and the fourth surface of the active portion 101 and are connected to the first internal electrode 121. In this case, a pair of first external electrodes 131a and 131b may be provided and disposed on the third surface S3 and the fourth surface S4, respectively. When the multilayer capacitor 100 is mounted on a substrate or the like, the first external electrodes 131a and 131b may be connected to signal lines, and thus, the multilayer capacitor 100 may function as a three-terminal capacitor.

The connection electrodes 132a and 132b cover the fifth surface S5 and the sixth surface S6 of the active portion 101 and are connected to the second internal electrode 122. In this case, the connection electrodes 132a and 132b may be provided as a pair and disposed on the fifth surface S5 and the sixth surface S6 of the active portion 101, respectively. In the present exemplary embodiment, the second internal electrode 122 is not directly connected to the second external electrodes 133a and 133b, but the connection electrodes 132a and 132b are disposed therebetween to implement an electrical connection structure. As illustrated in FIG. 2, the connection electrodes 132a and 132b may extend to the first surface S1 and the second surface S2 of the active portion 101. In this case, the connection electrodes 132a and 132b and the second external electrodes 133a and 133b may be connected in the first surface S1 and the second surface S2 of the active portion 101. In one example, the connection electrodes 132a and 132b may be partially embedded between the active portion 101 and the side margin portions 111 and 112. That is, the connection electrodes 132a and 132b may be partially embedded between in a body including the active portion 101 and the side margin portions 111 and 112. In the third direction (the Z-direction), a dimension of a portion of the connection electrode 132a or 132b embedded in the body may be less than a dimension of another portion of the connection electrode 132a or 132b disposed on a surface of the body. The another portion of the connection electrode 132a or 132b protruding from the surface of the body may be bent from the portion of the connection electrode 132a or 132b embedded in the body.

As illustrated, the side margin portions 111 and 1112 may have a length measured in the second direction (the Y-direction) longer than the connection electrodes 132a and 132b. Also, the second external electrodes 133a and 133b may have a length measured in the second direction (the Y-direction) longer than the connection electrodes 132a and 132b. Also, the length of the second external electrodes 133a and 133b measured in the second direction (the Y-direction) may be less than that of the side margin portions 111 and 112.

Figure 19:
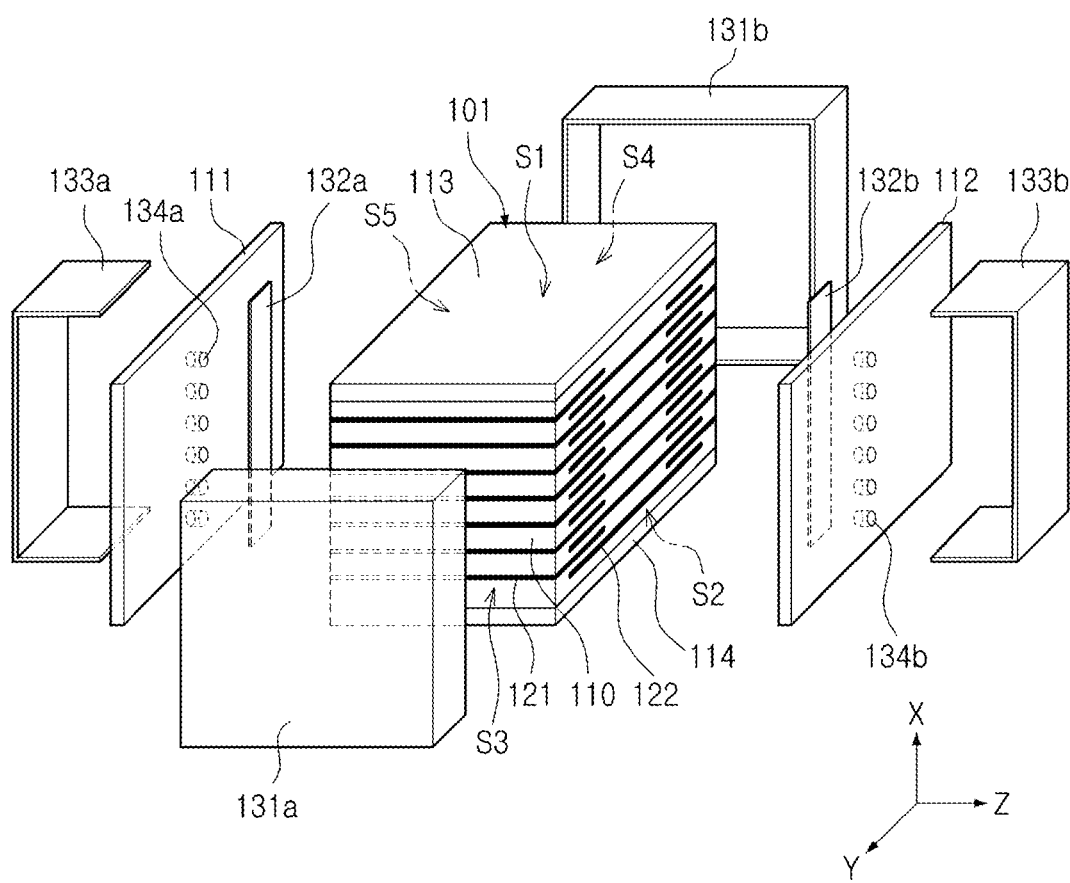
FIGS. 19 to 27 illustrate multilayer capacitors according to modified examples.

Meanwhile, a connection method between the connection electrodes 132a and 132b and the second external electrodes 133a and 133b may be vary. For example, as illustrated in a modified example of FIG. 19, an electrical connection may be implemented by the conductive vias 134a and 134b. In the modified example, the additionally included conductive vias 134a penetrating through the side margin portion 111 may connect the connection electrode 131a and the second external electrode 133a to each other, and the additionally included conductive vias 134b penetrating through the side margin portion 112 may connect the connection electrode 131b and the second external electrode 133b to each other. In FIG. 19, a plurality of conductive vias 134a and 134b exist on the fifth surface S5 side and the sixth surface S6 side, respectively, of the active portion 101, but only one of conductive vias 134a and 134b may exist in the fifth surface S5 and the sixth surface S6 of the active portion 101. When the connection electrodes 132a and 132b and the second external electrodes 133a and 133b are connected by the conductive vias 134a and 134b, the connection electrodes 132a and 132b may not extend to cover the first surface S1 and the second surface S2 of the active portion 101. Although not essential, the conductive vias 134a and 134b may be formed of the same material as that of the connection electrodes 132a and 132b, and in this case, process efficiency may be improved. The conductive vias 134a and 134b may be formed in the side margin portions 111 and 112 before the side margin portions 111 and 112 are attached to the active portion 101, and may be formed by drilling the side margin portions 111 and 112 and then filling the holes with a conductive paste.

Figure 20:
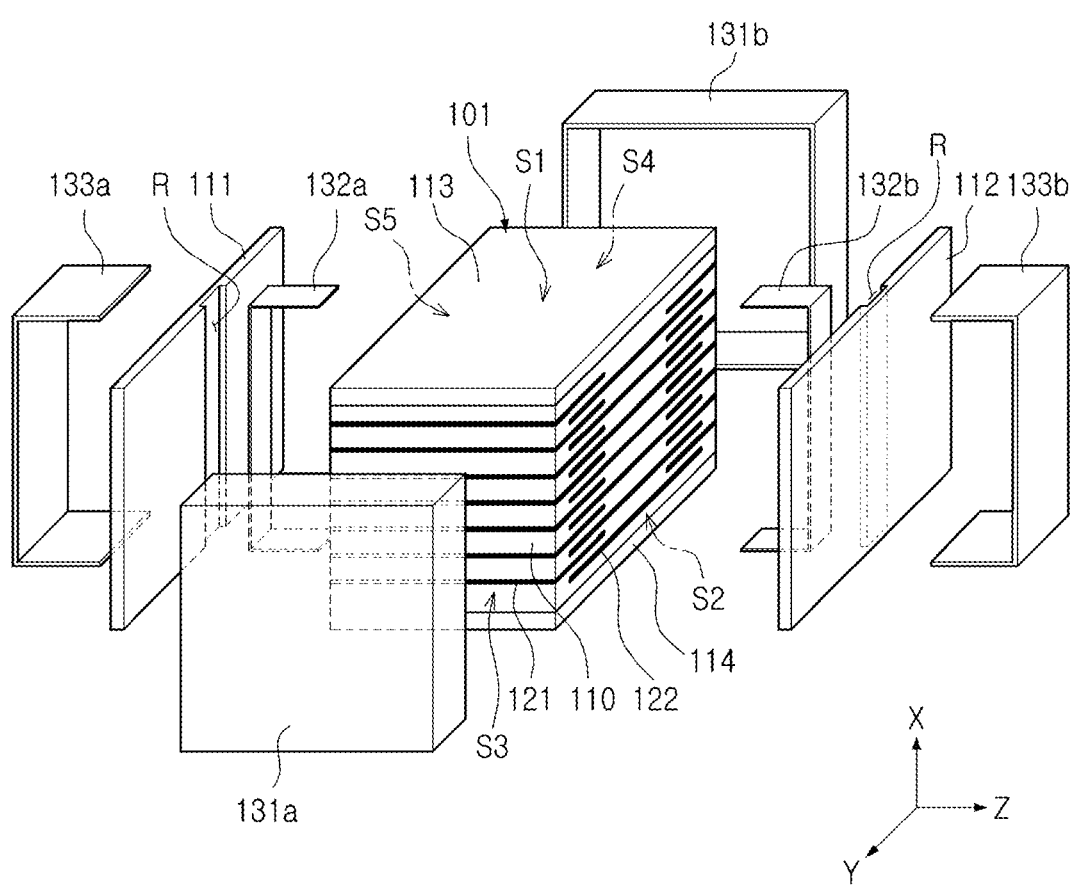
Figure 21:
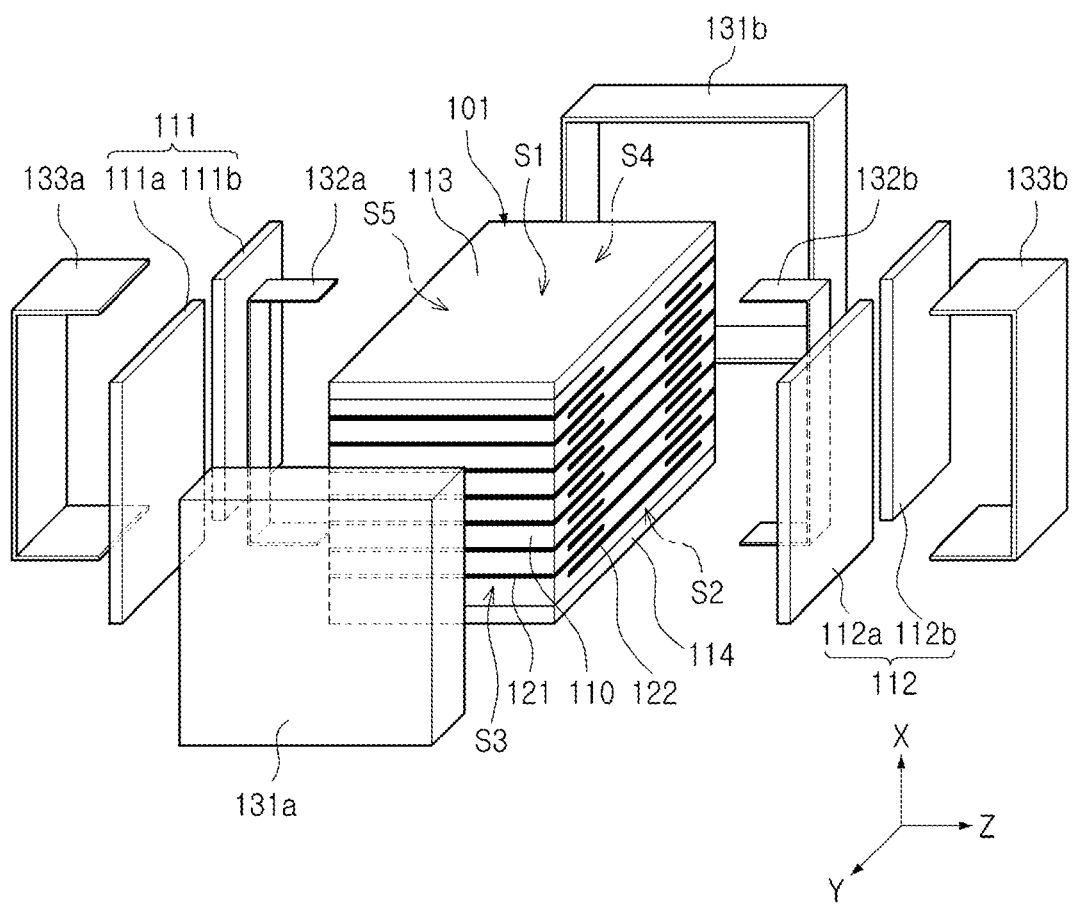

Alternatively, the conductive vias 134a and 134b may be formed in a state in which the side margin portions 111 and 112 are attached to the active portion 101. As another example, as illustrated in FIG. 20, the connection electrodes 132a and 132b may be disposed in the recesses R formed in the side margin portions 111 and 112, and in the case of the structure as in this modified example, a method of forming a conductive paste for forming the connection electrodes 132a and 132b in the recesses R of the side margin portions 111 and 112 and then attaching the conductive paste to the active portion 101 may also be used. As another example, as illustrated in FIG. 21, the side margin portions 111 and 112 may have a form separated into a plurality of sheets instead of one. Specifically, the side margin portions 111 and 112 may include first side margin portions 111a and 111b and second side margin portions 112a and 112b. In this case, the connection electrodes 132a and 132b may be implemented as a structure disposed between the first side margin portions 111a and 111b and the second side margin portions 112a and 112b, rather than being covered by the side margin portions 111 and 112. In this case, as alternative example, the connection electrodes 132a and 132b may not need to extend onto the first surface S1 and the second surface S2, although not shown in the drawings.

FIG. 6A is a plan view of the multilayer capacitor 100 viewed from the Z-direction, in which the second external electrodes 133a and 133b are not illustrated. FIGS. 6B and 6C illustrate the related art example not having a connection electrode, in which a connection form between the external electrode 33 and the internal electrodes 21 and 22 is illustrated. Referring to FIG. 6A, in the present exemplary embodiment, a width W2 of a region extending to the fifth surface S5 and sixth surface S6 of the active portion 101 in the second internal electrode 121 based on the width measured in the second direction (the Y-direction) may be wider than a width W1 of the connection electrodes 132a and 132b. This is a condition in which the possibility of misalignment between the second internal electrode 121 and the connection electrodes 132a and 132b may be significantly reduced compared to the related art example of FIGS. 6B and 6C. A further description of FIGS. 6A-6C will be provided later.

Figure 22:
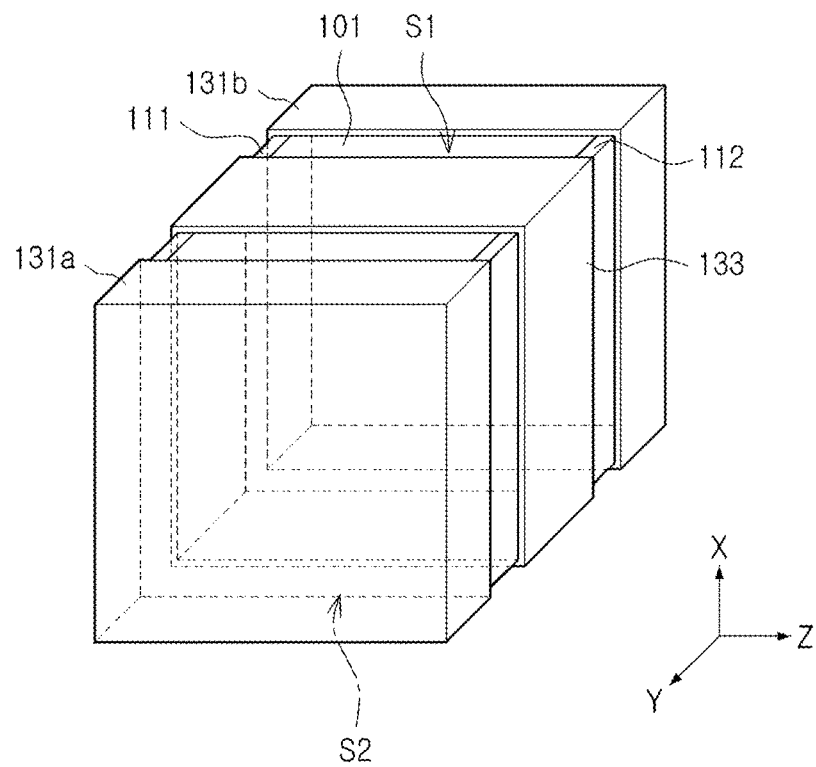
Figure 23:
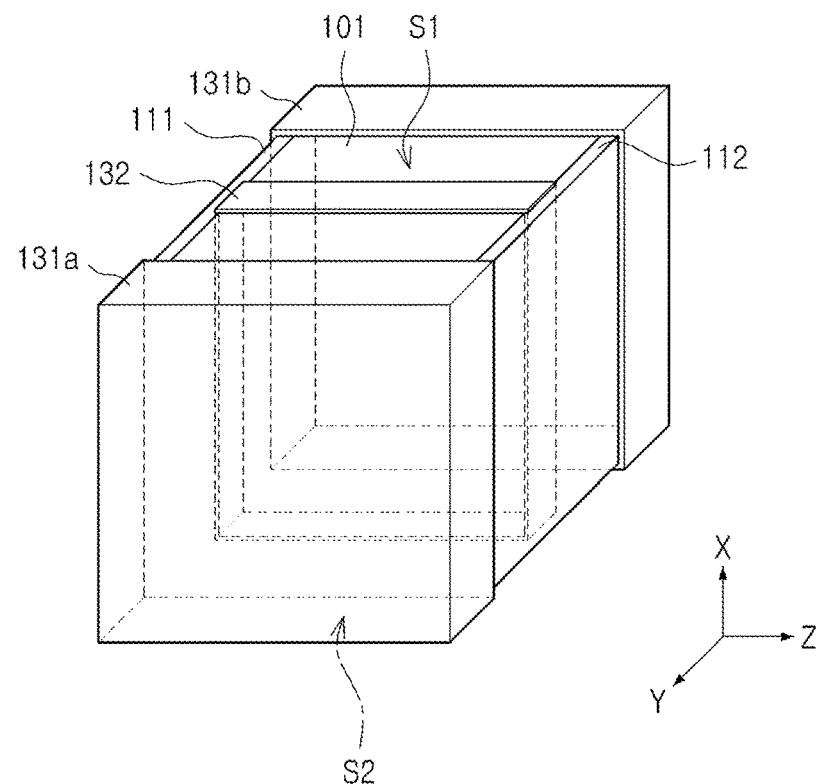

The second external electrodes 133a and 133b cover the side margin portions 111 and 112 on the fifth surface S5 and the sixth surface S6 side of the active portion 101 and connected to the connection electrode 132a and 132b as described above. A pair of the second external electrodes 133a and 133b may be provided, and in this case, the pair of second external electrodes 133a and 133b may cover the fifth surface S5 and the sixth surface S6 of the active portion 101 and may extend to the first surface S1 and the second surface S2, respectively. However, as in a modified example of FIG. 22, the second external electrode 133 may be formed as an integral structure instead of being separated as a pair. As a specific example, the second external electrode 133 may have a ring shape covering the first surface S1, the second surface S2, the fifth surface S5, and the sixth surface S6. In addition, as in a modified example of FIG. 23, the connection electrodes 132a and 132b may be formed in an integral structure without being separated as a pair, and the connection electrode 132 may have a ring shape covering the first surface S1, the second surface S2, the fifth surface S5, and the sixth surface S6 of the active portion 101. Although the second external electrode is not illustrated in FIG. 23, the second external electrode may have any of the shapes illustrated in FIGS. 1 and 22. Also, the ring structure illustrated in FIGS. 22 and 23 may be applied to all exemplary embodiments to be described later.

Meanwhile, the first external electrodes 131a and 131b, the connection electrodes 132a and 132b, and the second external electrodes 133a and 133b may be sintered electrodes including a conductive metal and glass. As an example of a process of forming the first external electrodes 131a and 131b, the connection electrodes 132a and 132b, and the second external electrodes 133a and 133b, a method of transferring a sheet including a conductive metal, an atomic layer deposition (ALD) method, a molecular layer deposition (MLD) method, a chemical vapor deposition (CVD) method, a sputtering method, etc. may be used. The conductive metal used in the first external electrodes 131a and 131b, the connection electrodes 132a and 132b, and the second external electrodes 133a and 133b may not be particularly limited as long as the material may be electrically connected to the internal electrodes to form a capacitance. For example, the conductive metal may include one or more selected from the group consisting of nickel (Ni), copper (Cu), palladium (Pd), silver (Ag), gold (Au), platinum (Pt), tin (Sn), tungsten (W), titanium (Ti), and alloys thereof. In addition, the electrode layers 201 and 202 may be used on the outside of the first external electrodes 131a and 131b and the second external electrodes 133a and 133b according to necessary functions, and, for example, a resin electrode layer 201, a plating layer 202, and the like may be additionally arranged sequentially.

The side margin portions 111 and 112 cover the connection electrodes 131a and 131b on the fifth surface S5 and the sixth surface S6 side of the active portion 101. As illustrated, a pair of side margin portions 111 and 112 may be provided, and in this case, the pair of side margin portions 111 and 112 may be disposed on the fifth surface S5 and the sixth surface S6 of the active portion 101. The side margin portions 111 and 112 may be formed by attaching a ceramic green sheet for side margin portions to the fifth surface S5 and the sixth surface S6 of the active portion 101. The side margin portions 111 and 112 may serve to prevent damage to the internal electrodes 121 and 122 due to physical or chemical stress, and as described above, the area of overlap of the internal electrodes 121 and 122 may be improved by reducing margin regions for forming the internal electrodes 121 and 122. More specifically, in order to realize a small-sized and high-capacity multilayer capacitor, the internal electrodes 121 and 122 may be extended to the surface of the active portion 101, thereby maximizing the internal electrodes 121 and 122. To this end, a method of separately attaching a ceramic green sheet for a side margin portion to cover the internal electrodes 121 and 122 in the third direction (the Z-direction) of the active portion 101 and then sintering the same may be used.

In addition to these advantages, in the case of the multilayer capacitor 100 having the structure of the present exemplary embodiment, moisture resistance reliability may be improved by using the side margin portions 111 and 112. When this is described with reference to FIGS. 6A-6C, in the case of FIG. 6A corresponding to the present exemplary embodiment, the internal electrodes 121 and 122 may be connected to the connection electrodes 132a and 132b, the side margin portions 111 and 112 covering the connection electrodes 132a and 132b may be employed, and accordingly, a moisture penetration path indicated by the arrow may be lengthened. alternatively, in the related art example of FIG. 6B, there is no side margin portion, and the internal electrodes 21 and 22 and the external electrode 33 are directly connected, and thus moisture penetration is easy, and this problem may be more salient when the alignment between the internal electrodes 21 and 22 and the external electrode 33 is not good as in the related art example.

Figure 7A:
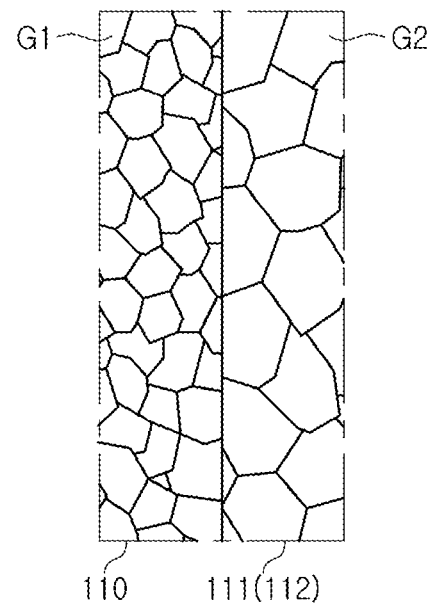
FIGS. 7A-7B are enlarged views of a region of a dielectric layer and a side margin portion.
Figure 7B:
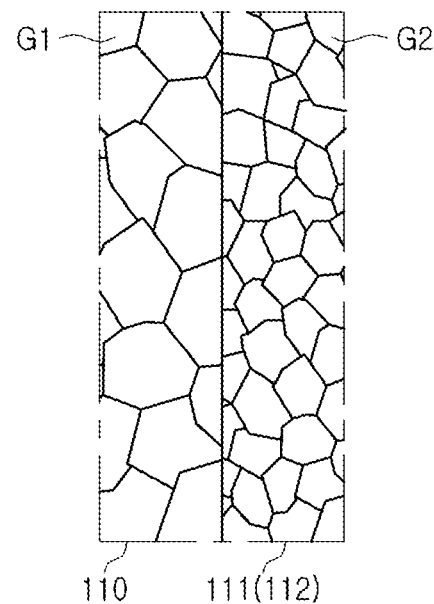

The dielectric layer 110 and the side margin portions 111 and 112 may be distinguished from each other by a grain size or color. Specifically, referring to FIGS. 7A-7B, when the dielectric layer 110 includes a first ceramic sintered body and the side margin portions 111 and 112 include a second ceramic sintered body, the grains G1 included in the first ceramic sintered body and the grains G2 included in the second ceramic sintered body may have different average sizes. FIG. 7A illustrates a case in which the average grain size of the first ceramic sintered body is smaller than the average grain size of the second ceramic sintered body, and in contrast, FIG. 7B illustrates a case in which an average grain size of the first ceramic sintered body is greater than an average grain size of the second ceramic sintered body is illustrated. In addition, the colors of the first and second ceramic sintered bodies may be different from each other, and the different colors may be visually distinguished. Such a color difference may refer to a difference of at least one of brightness, saturation, and color, and may be made due to a difference in grain size or component of the ceramic sintered body. As a specific example, in a size distribution (a first distribution) of the grains included in the first ceramic sintered body and a size distribution (a second distribution) of the grains included in the second ceramic sintered body, the average grain sizes of the first and second distributions may have a difference of 5% or greater, and in this case, a color difference between the first and second ceramic sintered bodies may be differentiated with the naked eye. In addition, even when the difference between the average grain size values in the first and second distributions is not large (less than 5%), if the difference in the standard deviation is 10% or greater, there may be a color difference between the first and second ceramic sintered bodies that may be visually distinguished. In addition, the color difference in the first and second ceramic sintered bodies may be effectively distinguished from the difference in brightness, and for example, a case in which there is a difference of 10 levels or greater in gray levels (0-255) of an image obtained from at least one cross-section may be defined as having a significant color difference.

A specific example of a method of measuring the size of grains included in the dielectric layer 110 and the side margin portions 111 and 112 will be described. First, as for the size of the grains G1 and G2, the multilayer capacitor 100 may be ground to a central position in the second direction (the Y-direction) to expose the first-third direction cross-section (an X-Z cross-section), and then the exposed cross-section, and the size of the grains G1 and G2 may be measured from an image of the exposed cross-section observed by using a scanning electron microscope (SEM) or an optical microscope. After clarifying the boundaries of the grains G1 and G2 in the obtained image using an image processing program, each area may be calculated, and the calculated area may be converted into an equivalent circle diameter to obtain the size of the grains G1 and G2.

Meanwhile, depending on the exemplary embodiment, the side margin portions 111 and 112 manufactured in a process separate from the active portion 101 may not be employed. In this case, the side margin portions 111 and 112 may be referred to as general insulating portions, and for example, the insulating portions may be formed of a dielectric material. In addition, the dielectric forming the insulating portion may include the same material as that of the dielectric layer 110 of the active portion 101. Even when provided in the form of a general insulating portion, a length of the insulating portion in the width direction may be longer than the aforementioned shape, that is, the connection electrodes 132a and 132b or the second external electrodes 133a and 133b, and also, the second external electrodes 133a and 133b may have a length in the width direction longer than the connection electrodes 132a and 132b. Here, the length in the width direction may be defined as direction (the Y-direction), perpendicular to one surface of the active portion 101, that is, the fifth surface S5 and the sixth surface S6 in the present exemplary embodiment and a stacking direction (the X-direction) of the plurality of internal electrodes 121 and 122.

An example of a method of manufacturing a multilayer capacitor will be described with reference to FIGS. 8A-8G, and reference numerals are omitted for some of the components described above. This process example may be performed in the order of FIGS. 8A to 8G. First, the active portion 101 is formed. This process may include alternately stacking a ceramic green sheet and an internal electrode pattern and dicing the ceramic green sheet into a unit device.

As an example, an internal electrode pattern may be formed on a ceramic green sheet by a screen-printing method, a gravure printing method, or the like, and the internal electrode pattern may be repeatedly stacked. In the case of the dicing process, a method known in the art, such as mechanical machining or laser machining, may be used. FIG. 8A illustrates the active portion 101 in the form of a unit device after the dicing operation.

Figure 9:
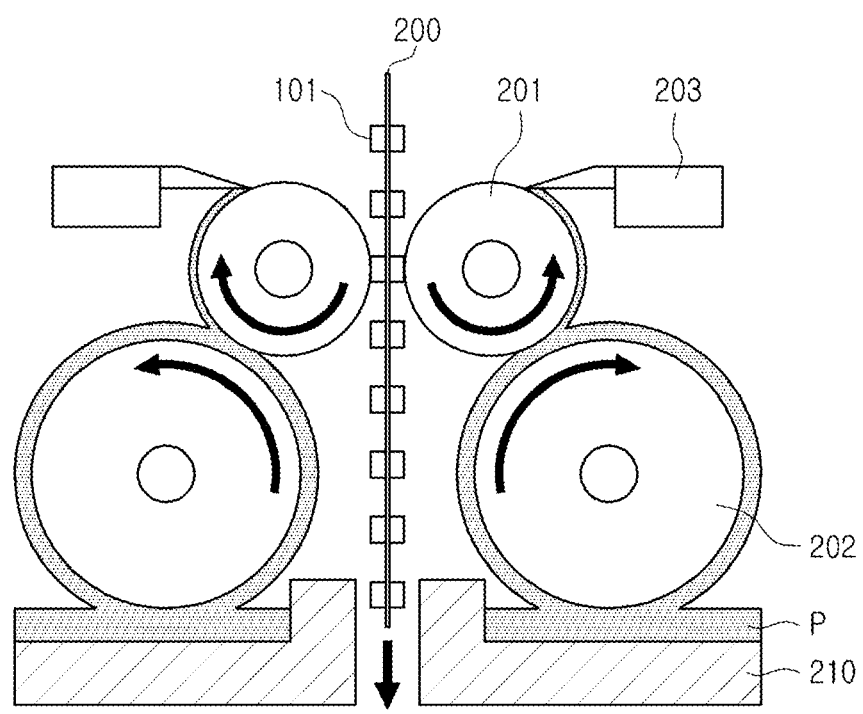
FIG. 9 illustrates an electrode coating process using an electrode coating device.

Next, a connection electrode is formed on a surface of the active portion 101. In this case, a printing method as illustrated in FIG. 8B may be used, which will be described in more detail with reference to FIG. 9. FIG. 9 illustrates an operation example of an electrode printing device. In the present printing process, a pattern of a predetermined shape is formed by applying a conductive paste P on the surface of the active portion 101, while a component-side wheel 201 rotates, which corresponds to a pattern for the connection electrodes 132a and 132b described above. In this case, a portion of the patterns 132a and 132b for connection electrodes may move to and cover upper and lower surfaces of the active portion 101 (the first and second surfaces in the exemplary embodiment described above). As illustrated, a plurality of active portions 101 may be disposed on a carrier sheet 200, for example, the active portion 101 may be coupled to recesses of the carrier sheet 200 so that one side and the other side of the active portion 101 may be exposed. In addition, the carrier sheet 200 may move downward so that the printing process may be sequentially performed. In this for case, patterns connection electrodes may be formed on one side and the other side of the active portion 101, and the patterns for connection electrodes may be formed simultaneously. The conductive paste P may include metal, glass, a binder, etc., and when the conductive paste P is applied to the surface of the active portion 101, a wheel blade 203 may be provided to control the amount and formation area of the conductive paste P. Also, the conductive paste P stored in a tray 210 may move to the component side wheel 201 through a tray side wheel 202. As a method of forming the connection electrodes 132a and 132b, a dipping process, a transfer process, etc. may also be used. However, the printing process illustrated in FIG. 9 may be more suitable to precisely form the connection electrodes 132a and 132b in a specific region. In addition, when the connection electrodes 132a and 132b are formed before forming the side margin portion as in the present exemplary embodiment, moisture penetration that may easily occur in a region in which the inner and outer electrodes are connected may be effectively suppressed.

After the connection electrodes 132a and 132b are formed, green sheets 111 and 112 for side margin portions are attached to the active portion 101 as illustrated in FIG. 8C. As a specific process example, after arranging the green sheets 111 and 112 for the side margin portion on a carrier formed of an elastic material, the green sheets 111 and 112 may be pressed and adhered to one surface of the active portion 101. FIG. 8D illustrates a stack 101A in a state before a sintering operation is performed after the green sheets 111 and 112 for the side margin portions are attached, and thereafter, the stack 101A is sintered. After sintering the stack 101A, as illustrated in FIG. 8E, a paste E for an external electrode is applied to the stack 101A, which is to form the second external electrodes 133a and 133b connected to the connection electrodes 132a and 132b. The application process of the paste M for an external electrode may be performed by the same printing process as that described with reference to FIG. 8B, and in addition, a dipping process, a transfer process, or the like, may also be used. After the paste M for an external electrode is applied, a process of sintering the paste M may be performed.

Next, the first external electrodes 131a and 131b may be formed, and a transfer process may be used as illustrated in FIG. 8F. As a specific example of the transfer process, a portion of the sheet 231 is detached by pressing the stack 101B against the sheet 231 containing a conductive metal, and the transfer process may be performed on both sides of the stack 101B opposing each other. FIG. 8G illustrates the multilayer capacitor 100 in a state in which external electrodes are formed, and if necessary, an additional electrode layer, a resin electrode layer, a plating layer, etc., covering the first and second external electrodes 131a and 131b as described above may also be formed.

Meanwhile, in relation to the operation of forming the active portion 101 of FIG. 8A, more specific examples of a methods of forming the internal electrodes and various shapes that may be obtained therefrom will be described with reference to FIGS. 10A to 18B. The internal electrodes are individualized by the aforementioned cutting process, and first, FIGS. 10A and 10B illustrate the first internal electrode 121 and the second internal electrode 122 individualized in units of parts as dicing is performed along the dotted line. In this case, FIGS. 10A and 10B illustrate an example in which the first internal electrode 121 and the second internal electrode 122 are formed in separate patterns P1 and P2. Alternatively, FIG. 11 illustrates an example in which the first internal electrode 121 and the second internal electrode 122 are connected as one pattern P3, and in this case, the pattern P3 is stacked so that the second internal electrode 122 is formed on the first internal electrode 121. The first internal electrode 121 and the second internal electrode 122 obtained through the patterns P1, P2, and P3 of FIGS. 10A, 10B, and 11 may have the structures illustrated in FIGS. 3 and 4.

Figure 12:
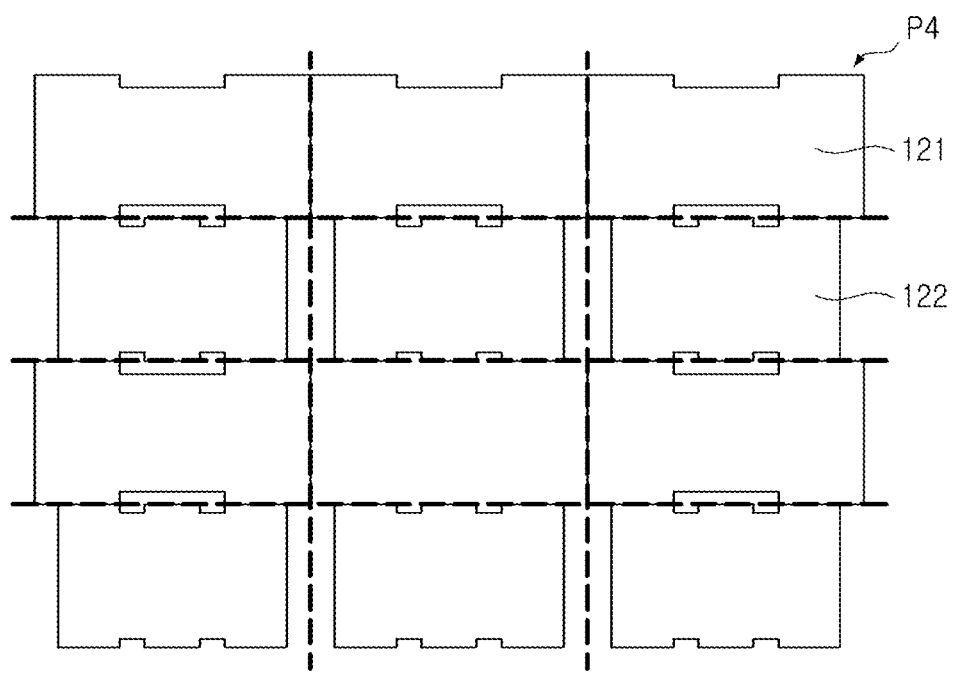
Figure 13A:
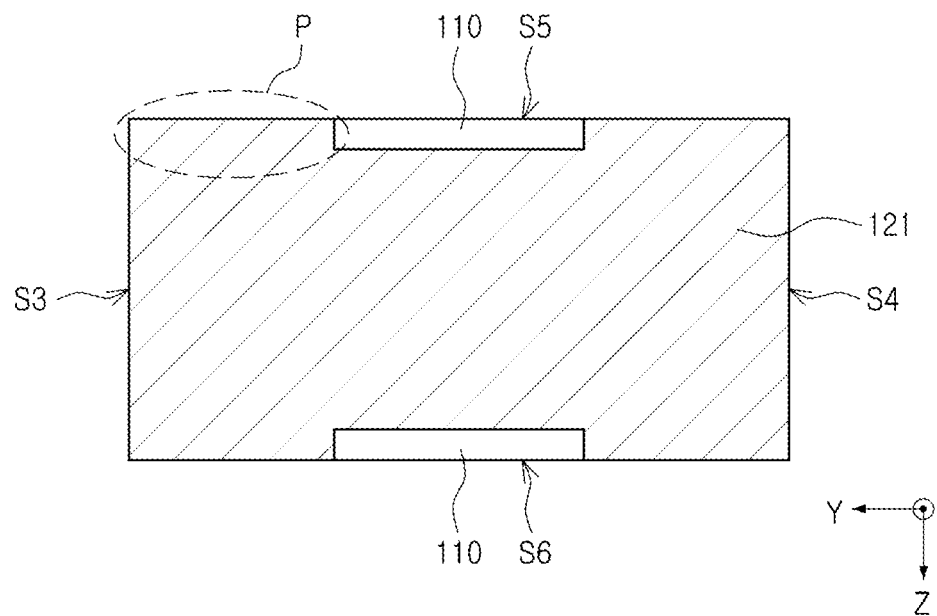
Figure 13B:
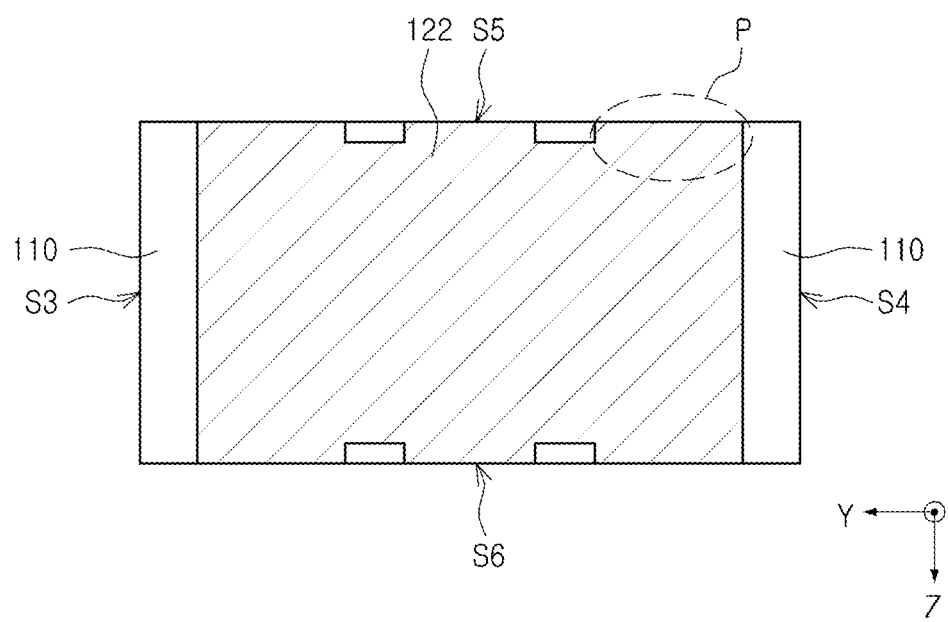

FIG. 12 illustrates a pattern P4 for an internal electrode for obtaining an internal electrode having a shape different from that of the previous exemplary embodiment. In FIG. 12, the first internal electrode 121 and the second internal electrode 122 are connected to each other. FIGS. 13A and 13B illustrate the internal electrodes in an individualized state after the cutting process. For example, FIG. 13A corresponds to the first internal electrode 121, and FIG. 13B corresponds to the second internal electrode 122. In this example, the first internal electrode 121 has the same shape as that of FIG. 3, and the second internal electrode 122 has a plurality of protrusions P extending to the fifth surface S5 and the sixth surface S6 of the active portion 101.

Figure 14:
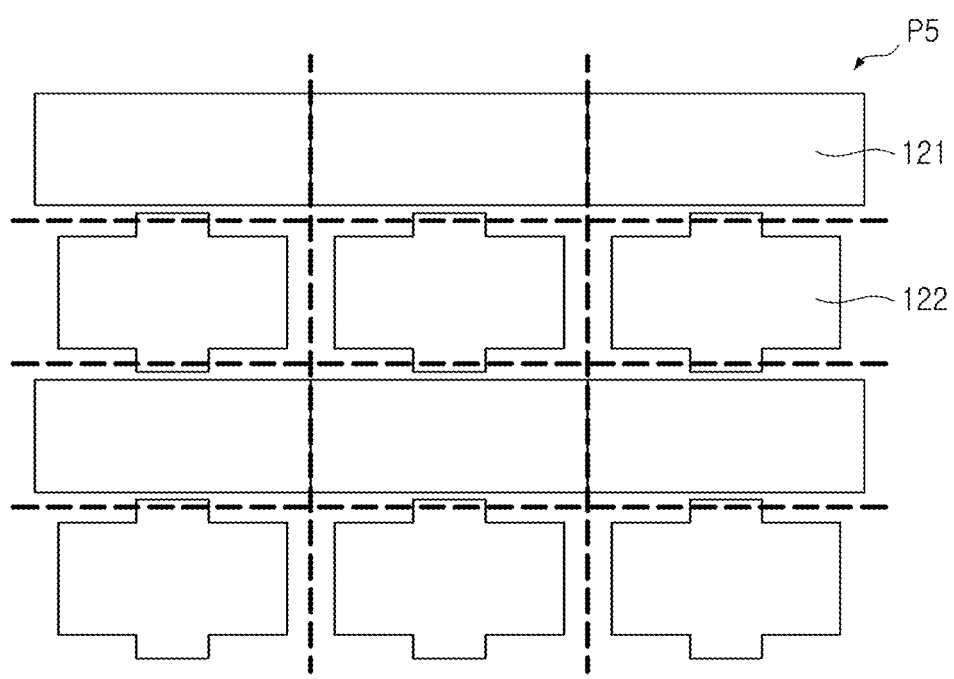
Figure 15A:
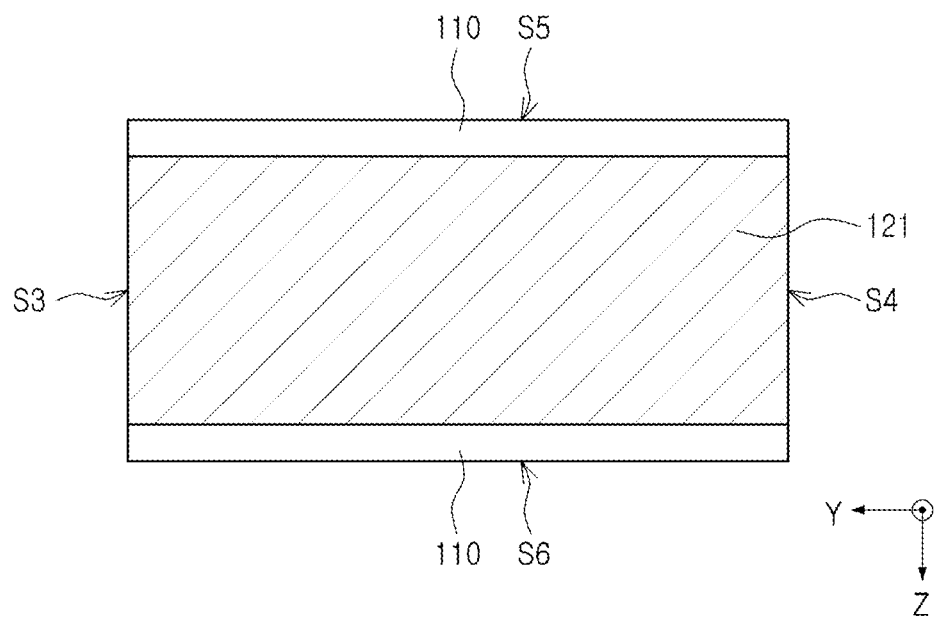
Figure 15B:
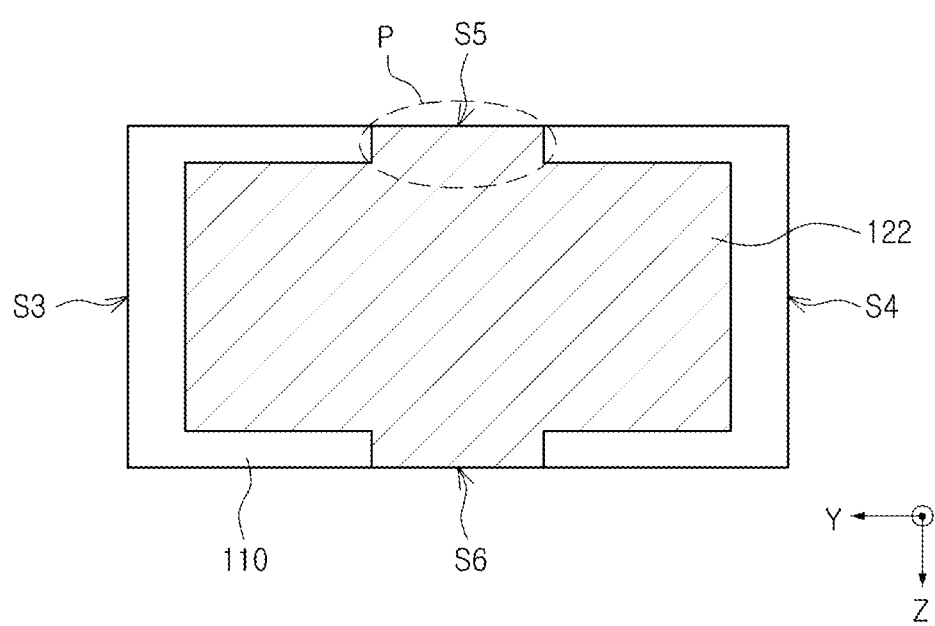

FIG. 14 illustrates a pattern P5 for an internal electrode for obtaining an internal electrode having another shape, in which the first internal electrode 121 and the second internal electrode 122 may not be physically connected but may be manufactured as a single pattern P5 overall. FIGS. 15A and 15B illustrate an internal electrode obtained by using the pattern P5 of FIG. 14. For example, FIG. 15A corresponds to the first internal electrode 121 and FIG. 15B corresponds to the second internal electrode 122. In this example, the first internal electrode 121 is formed in a flat plate shape without a protrusion. The second internal electrode 122 has a protrusion P extending to the fifth surface S5 and the sixth surface S6 of the active portion 101. Here, the protrusions P of the second internal electrode 122 are disposed on the fifth surface S5 and the sixth surface S6, respectively, and may be disposed in a central portion of the second internal electrode 122 in the second direction (the Y-direction).

Figure 16:
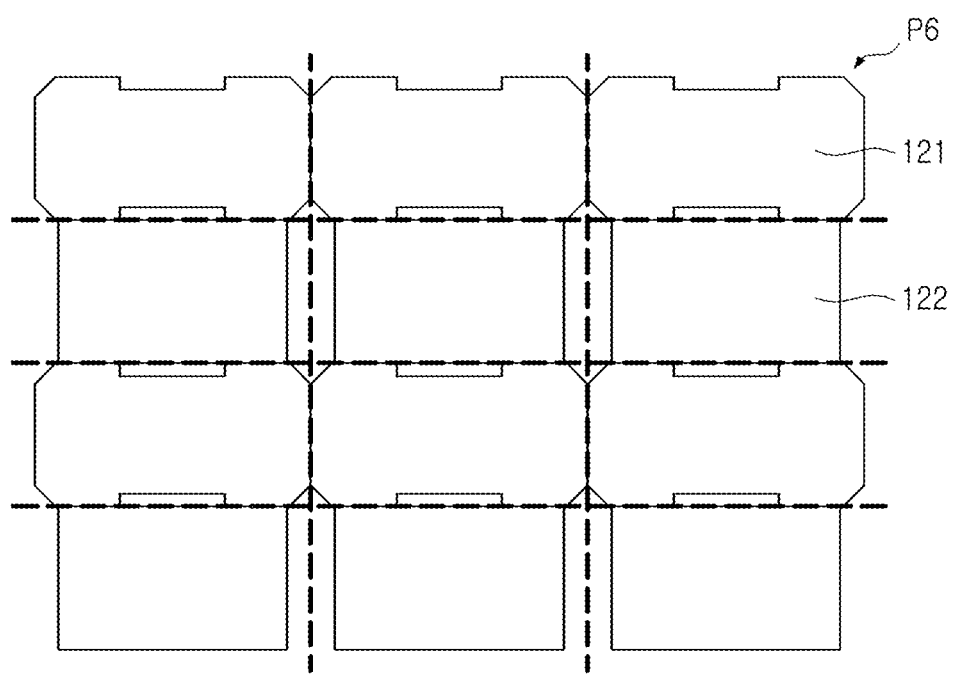
Figure 17A:
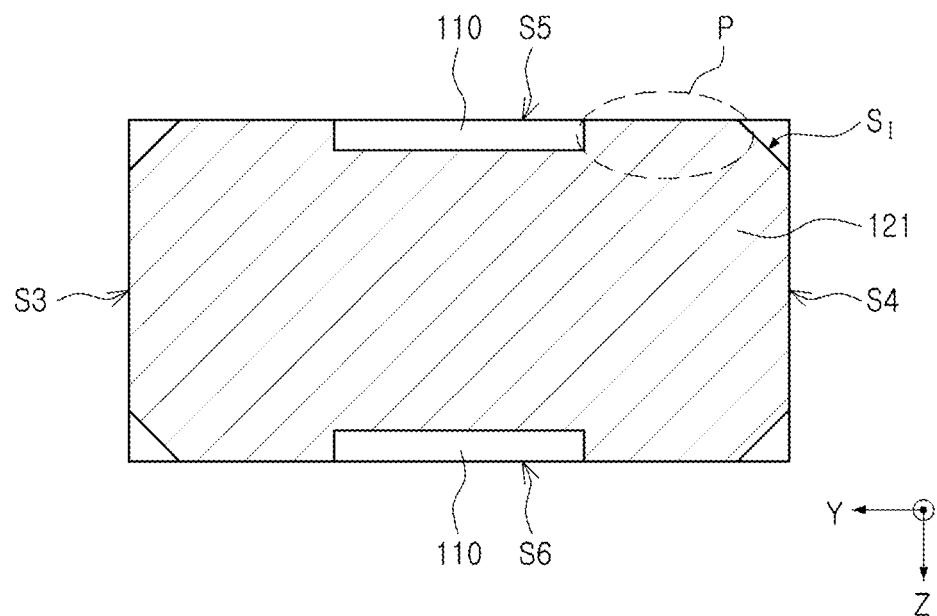
Figure 17B:
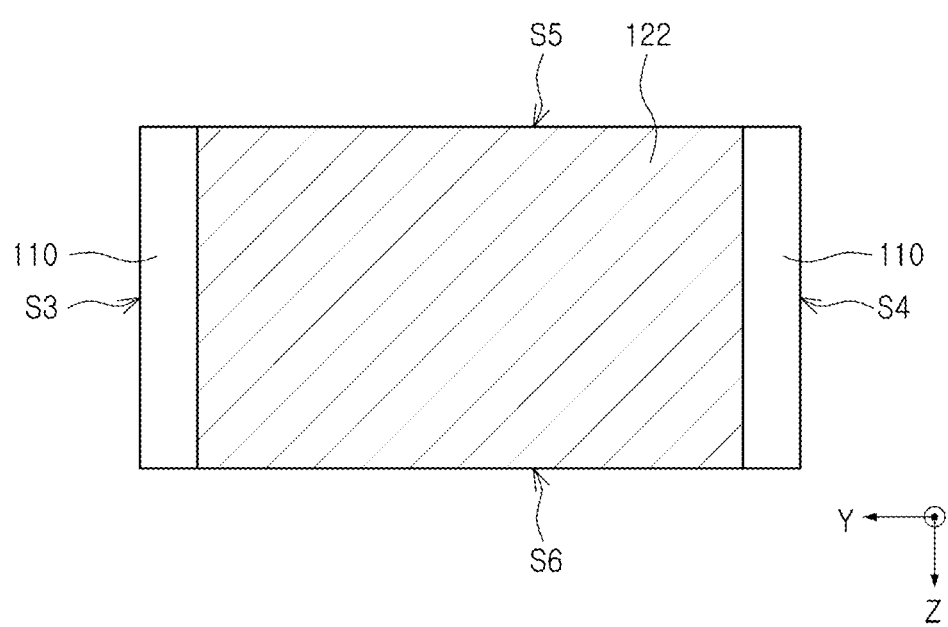
Figure 18A:
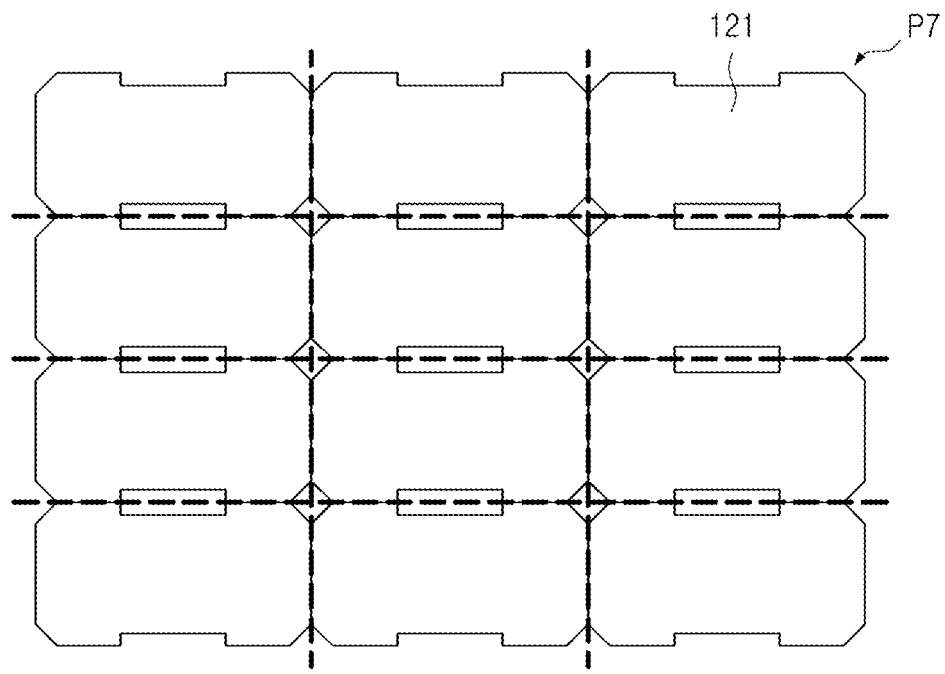
Figure 18B:
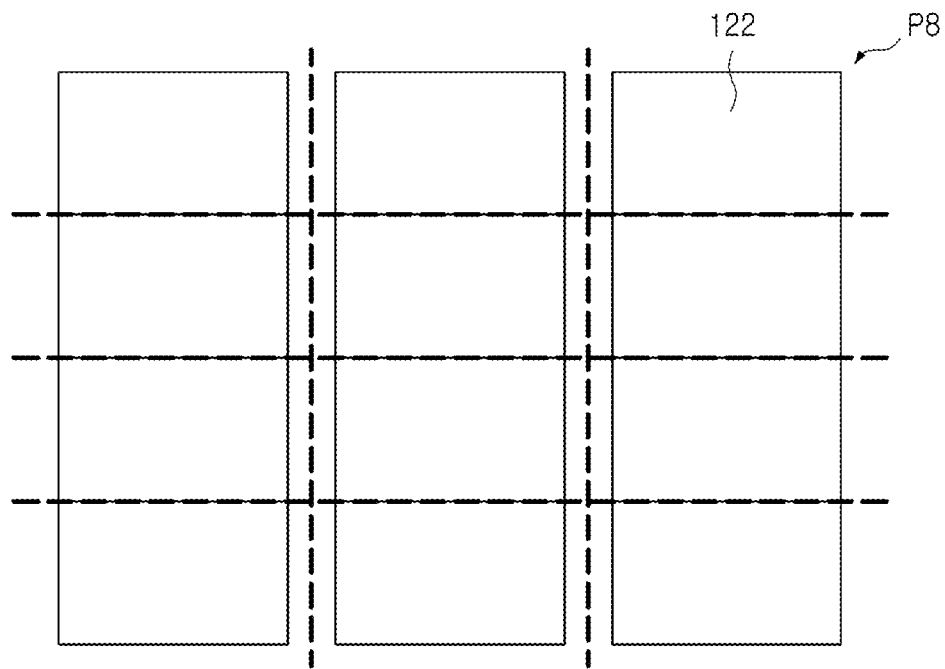

FIG. 16 illustrates a pattern P6 for an internal electrode for obtaining an internal electrode having another shape, in which the first internal electrode 121 and the second internal electrode 122 are connected to each other. FIGS. 17A and 117B illustrate an internal electrode obtained by using the pattern P5 of FIG. 16. For example, FIG. 17A corresponds to the first internal electrode 121, and FIG. 17B corresponds to the second internal electrode 122. In this example, the second internal electrode 122 is formed in a flat plate shape without a protrusion. The first internal electrode 121 has a plurality of protrusions P extending to the fifth surface S5 and the sixth surface S6 of the active portion 101. In this case, the plurality of protrusions P in the first internal electrode 121 have side surfaces SI inclined with respect to the third to sixth surfaces S3 to S6 of the active portion 101. When the degree of bonding between the side margin portions 111 and 112 is not high, a portion of the region may be separated from the active portion 101. In this case, an edge portion of the active portion 101 may be vulnerable to moisture resistance. As in this example, when the protrusion P of the first internal electrode 121 has the inclined side surface SI, the possibility of moisture resistance failure at the edge of the active portion 101 may be reduced. In this case, at least a portion of the region corresponding to the inclined side surface $S_I$ of the first internal electrode 121 may not overlap the second internal electrode 122 in the first direction (the X-direction), which is a stacking direction of the internal electrodes 121 and 122, in order not to cause a decrease in capacitance. When a portion of the first internal electrodes 121 and 122 is removed to form the inclined side surface $S_I$, a region overlapping the second internal electrode 122 may be removed to be as small as possible, thereby preventing a degradation of the capacitance. Meanwhile, unlike the form illustrated in FIG. 16, the first internal electrode 121 and the second internal electrode 122 may be formed in separate patterns P7 and P8 as illustrated in FIGS. 18A and 18B. FIG. 18A corresponds to the first internal electrode 121 an FIG. 18B corresponds to the second internal electrode 122.

Figure 24:
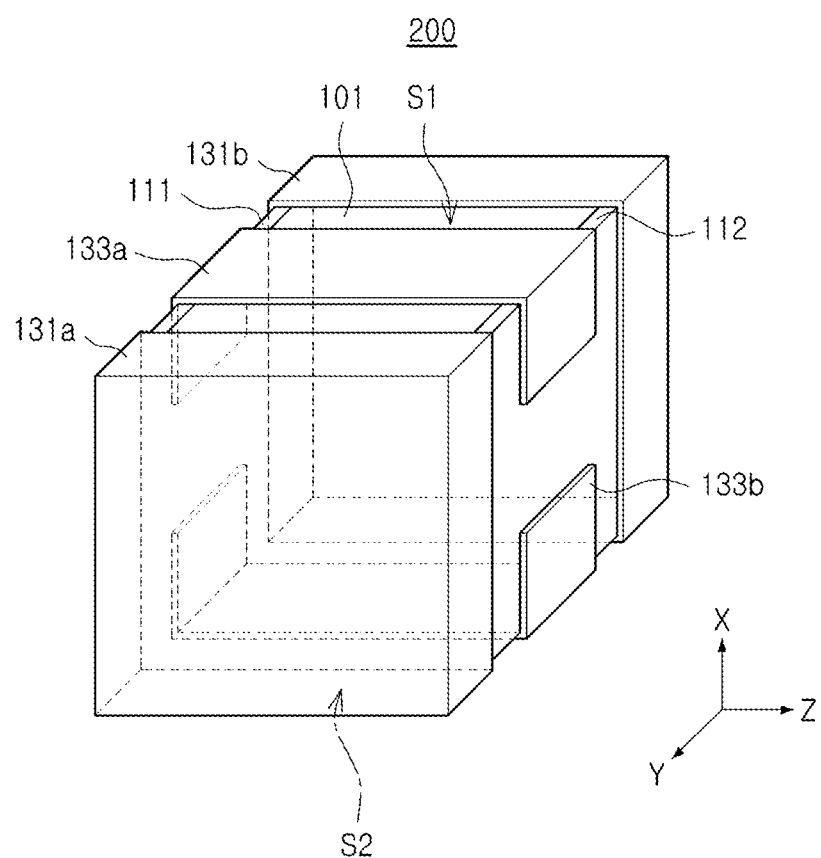
Figure 25:
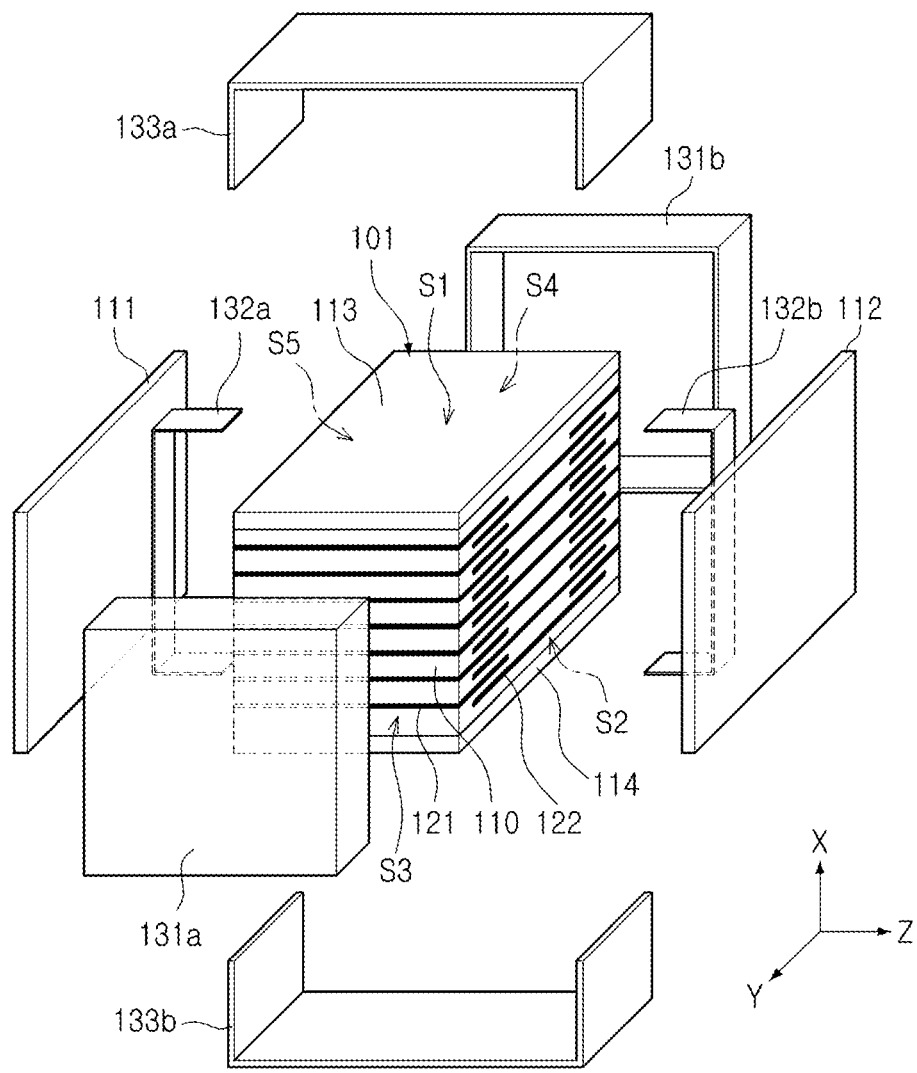
Figure 26:
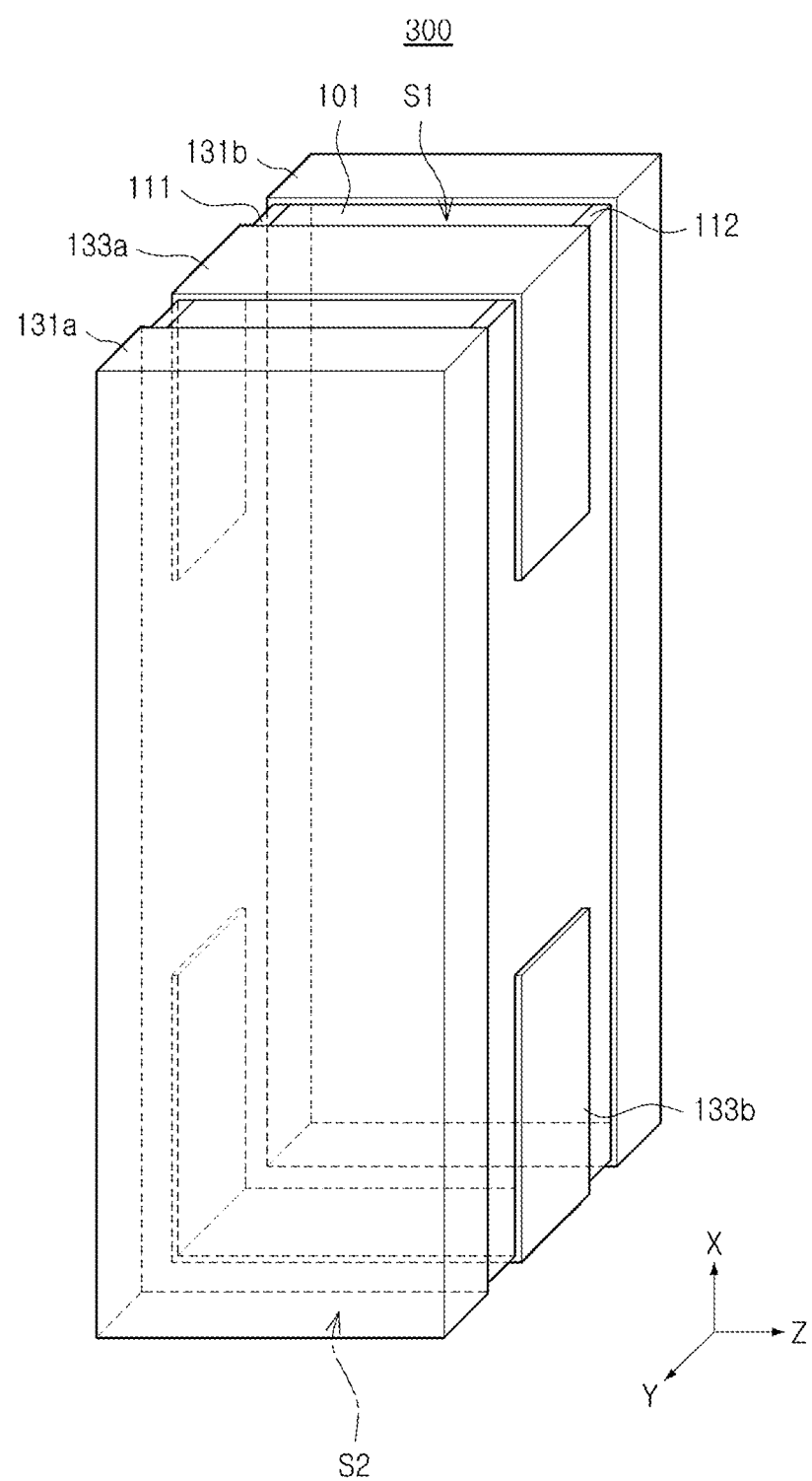
Figure 27:
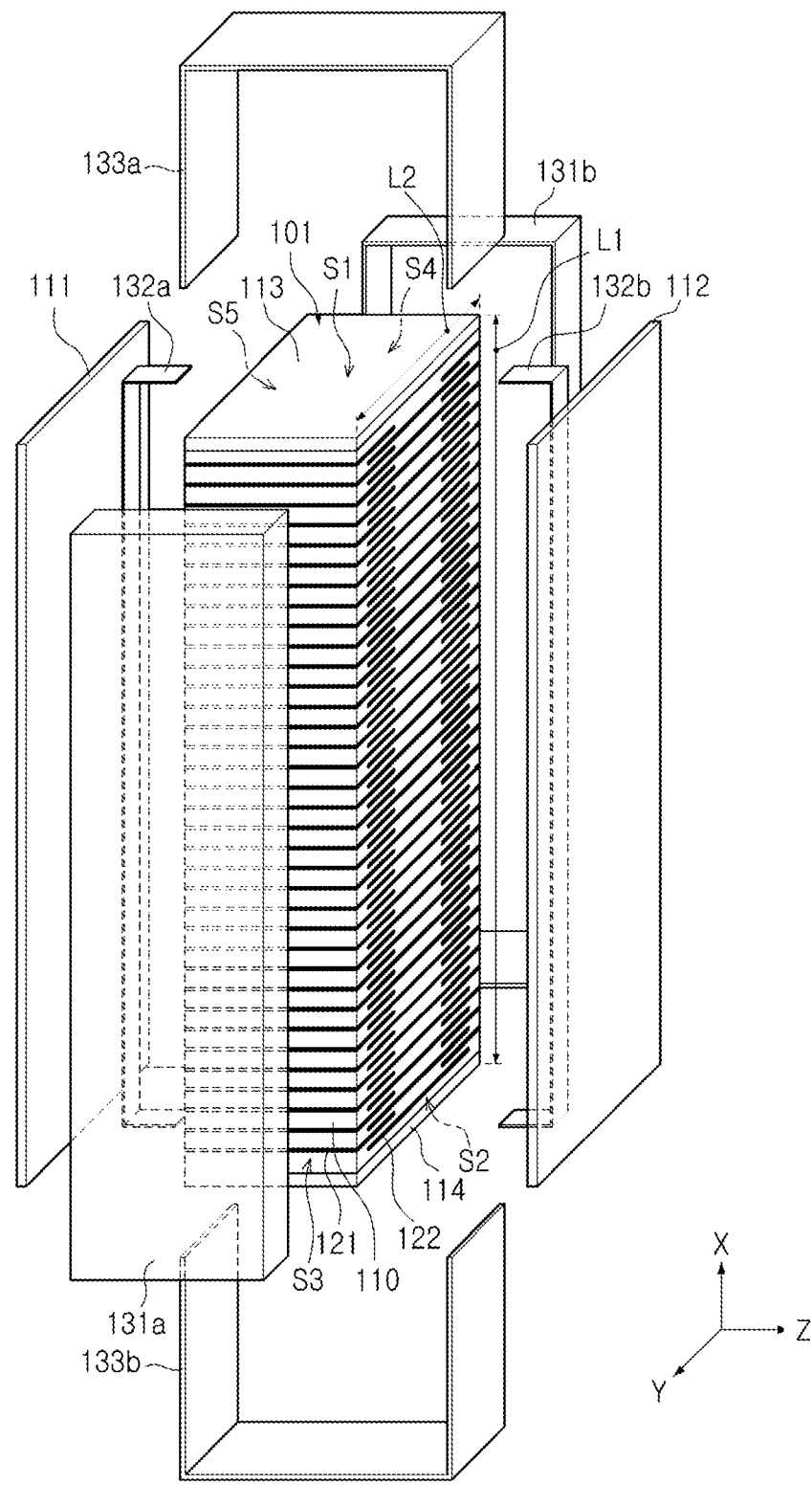

Additional exemplary embodiments of the present disclosure will be described with reference to FIGS. 24 to 27, wherein FIG. 25 is an exploded perspective view of FIG. 24 and FIG. 27 is an exploded perspective view of FIG. 26. In the present modified examples, the shapes of the internal electrodes 121 and 122 and the connection electrodes 131a and 131b are substantially the same as those of the previous exemplary embodiments, and there is a difference only in the manner in which the external electrodes are disposed or the shape of the active portion. First, referring to FIGS. 24 and 25, in the case of a multilayer capacitor 200 according to the present modified example, the second external electrodes 133a and 133b are formed in positions different from those of the previous exemplary embodiment. Specifically, the pair of second external electrodes 133a and 133b cover the first surface S1 and the second surface S2 of the active portion 101 and extend to the fifth surface S5 and the sixth surface S6, respectively. According to this shape, the pair of second external electrodes 133a and 133b may be simultaneously connected to the pair of connection electrodes 132a and 132b, respectively, rather than being connected to only one connection electrode. As the formation positions of the second external electrodes 133a and 133b are changed, the multilayer capacitor 200 may be mounted on a substrate or the like in the third direction (the Z-direction). In this case, the internal electrodes 121 and 122 may be disposed in a direction, perpendicular to a mounting surface.

Next, referring to FIGS. 26 and 27, in the case of a multilayer capacitor 300 according to the present modified example, the pair of second external electrodes 133a and 133b cover the first surface S1 and the second surface S2 of the active portion 101 and extend to fifth surface S5 and the sixth surface S6, respectively. According to this shape, the pair of second external electrodes 133a and 133b may be simultaneously connected to the pair of connection electrodes 132a and 132b, respectively, rather than being connected to only one connection electrode. In this modified example, the active portion 101 has a shape in which the length L1 in the first direction (the X-direction) is longer than the length L2 in the second direction (the Y-direction). When the multilayer capacitor 300 is mounted on a substrate or the like in the third direction (the Z-direction), the internal electrodes 121 and 122 may be disposed in a direction, perpendicular to a mounting surface. In addition, since the active portion 101 has the aforementioned length condition, when mounted on a substrate or the like in the third direction (the Z-direction), the stacking number of the internal electrodes 121 and 122 may be maintained to be high to be suitable for a low-profile structure having a thin thickness, while satisfying the capacitance characteristics.

As set forth above, in the case of the multilayer capacitor according to an exemplary embodiment in the present disclosure, at least one of characteristics such as capacitance, structural stability, and moisture resistance reliability may be improved.

While example exemplary embodiments have been illustrated and described above, it will be apparent to those skilled in the art that modifications and variations could be made without departing from the scope of the present disclosure as defined by the appended claims.

What is claimed is:
1. A multilayer capacitor comprising:
an active portion including a dielectric layer and first and second internal electrodes stacked with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode covering the third and fourth surfaces of the active portion and connected to the first internal electrode;
a connection electrode covering the fifth and sixth surfaces of the active portion and connected to the second internal electrode;
a side margin portion covering the connection electrode on the fifth surface and the sixth surface of the active portion; and
a second external electrode covering the side margin portions on the fifth surface and the sixth surface of the active portion and connected to the connection electrode.

2. The multilayer capacitor of claim 1, wherein each of the first external electrode, the connection electrode, and the second external electrode is provided as a pair.

3. The multilayer capacitor of claim 2, wherein the pair of second external electrodes cover the fifth and sixth surfaces of the active portion and extend to the first and second surfaces, respectively.

4. The multilayer capacitor of claim 2, wherein the pair of second external electrodes cover the first surface and the second surface of the active portion and extend to the fifth surface and the sixth surface, respectively.

5. The multilayer capacitor of claim 4, wherein a length of the active portion in the first direction is longer than a length of the active portion in the second direction.

6. The multilayer capacitor of claim 1, wherein a length of the side margin portion in the second direction is longer than a length of the connection electrode in the second direction.

7. The multilayer capacitor of claim 1, wherein a length of the second external electrode in the second direction is longer than a length of the connection electrode in the second direction.

8. The multilayer capacitor of claim 1, wherein a length of the second external electrode in the second direction is shorter than a length of the side margin portion in the second direction.

9. The multilayer capacitor of claim 1, wherein the second external electrode has a ring shape covering the first surface, the second surface, the fifth surface, and the sixth surface of the active portion.

10. The multilayer capacitor of claim 1, wherein the connection electrode has a ring shape covering the first surface, the second surface, the fifth surface, and the sixth surface of the active portion.

11. The multilayer capacitor of claim 1, wherein the connection electrode extends to the first surface and the second surface of the active portion, and the connection electrode and the second external electrode are connected to each other in the first surface and the second surface of the active portion.

12. The multilayer capacitor of claim 1, further comprising at least one conductive via passing through the side margin portion to connect the connection electrode to the second external electrode.

13. The multilayer capacitor of claim 1, wherein the dielectric layer and the side margin portion include first and second ceramic sintered bodies, respectively, and the first and second ceramic sintered bodies have different average grain sizes.

14. The multilayer capacitor of claim 13, wherein a difference between the average grain sizes of the first and second ceramic sintered bodies is 5% or greater.

15. The multilayer capacitor of claim 13, wherein a difference between average grain sizes of the first and second ceramic sintered bodies is less than 5%, and
size distributions of grains included in the first and second ceramic sintered bodies are first and second distributions, respectively, and a standard deviation of the first and second distributions is equal to or greater than 10%.

16. The multilayer capacitor of claim 1, wherein the dielectric layer and the side margin portion include first and second ceramic sintered bodies, respectively, and colors of the first and second ceramic sintered bodies are different from each other.

17. The multilayer capacitor of claim 16, wherein a difference in gray level of images obtained from cross-sections of the first and second ceramic sintered bodies is 10 levels or greater.

18. The multilayer capacitor of claim 1, wherein the first internal electrode extends to the third surface and the fourth surface of the active portion.

19. The multilayer capacitor of claim 18, wherein the first internal electrode extends to the fifth surface and the sixth surface of the active portion.

20. The multilayer capacitor of claim 19, wherein the first internal electrode has a plurality of protrusions extending to the fifth and sixth surfaces of the active portion.

21. The multilayer capacitor of claim 20, wherein the plurality of protrusions in the first internal electrode have side surfaces inclined with respect to the third to sixth surfaces of the active portion.

22. The multilayer capacitor of claim 21, wherein a region corresponding to the inclined side surface of the first internal electrode does not overlap the second internal electrode in the first direction.

23. The multilayer capacitor of claim 20, wherein the connection electrode is disposed in a region between the plurality of protrusions.

24. The multilayer capacitor of claim 1, wherein the second internal electrode extends to the fifth and sixth surfaces of the active portion.

25. The multilayer capacitor of claim 24, wherein a width, in the second direction, of a region extending from the second internal electrode to the fifth surface and the sixth surface of the active portion is wider than a width of the connection electrode in the second direction.

26. The multilayer capacitor of claim 24, wherein the second internal electrode has a flat plate shape.

27. The multilayer capacitor of claim 24, wherein the second internal electrode has a plurality of protrusions extending to the fifth and sixth surfaces.

28. The multilayer capacitor of claim 1, wherein the connection electrode is disposed in a recess in the side margin portion.

29. A multilayer capacitor comprising:
an active portion including a dielectric layer and first and second internal electrodes stacked with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode covering the third and fourth surfaces of the active portion and connected to the first internal electrode;
a connection electrode covering the fifth and sixth surfaces of the active portion and connected to the second internal electrode;
a side margin portion covering the fifth surface and the sixth surface of the active portion and having a plurality of separated regions; and
a second external electrode covering the side margin portion on the fifth surface and the sixth surface of the active portion and connected to the connection electrode.

30. A multilayer capacitor comprising:
an active portion including a dielectric layer and a plurality of internal electrodes stacked with the dielectric layer interposed therebetween;
a connection electrode covering at least one surface of the active portion and connected to the plurality of internal electrodes;
an insulating portion covering the connection electrode and having a length in a width direction, parallel to the one surface and perpendicular to a stacking direction of the plurality of internal electrodes, longer than the connection electrode; and
at least three external electrodes covering the insulating portion,
wherein at least one of the external electrodes directly contacts the connection electrode.

31. The multilayer capacitor of claim 30, wherein
a length of at least one of the external electrodes in the width direction is shorter than the insulating portion in the width direction.

32. A multilayer capacitor comprising:
an active portion including a dielectric layer and a plurality of internal electrodes stacked with the dielectric layer interposed therebetween;
a connection electrode covering at least one surface of the active portion and connected to the plurality of internal electrodes;
an insulating portion covering the connection electrode and having a length in a width direction, parallel to the one surface and perpendicular to a stacking direction of the plurality of internal electrodes, longer than the connection electrode; and
an external electrode covering the insulating portion and connected to the connection electrode,
wherein a length of at least one of the external electrodes in the width direction is longer than a length of the connection electrode in the width direction.

33. A multilayer capacitor comprising:
an active portion including a dielectric layer and first and second internal electrodes stacked with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction, wherein the first internal electrode extends to the third surface and one or more of the fifth surface and the sixth surface, and the second internal electrode extends to the one or more of the fifth surface and the sixth surface;
a first external electrode disposed on the third surface of the active portion and connected to the first internal electrode;
a pair of connection electrodes disposed on the fifth surface and the sixth surface of the active portion and connected to the second internal electrode;
a second external electrode disposed on the one or more of the fifth surface and the sixth surface of the active portion and connected to the connection electrode; and
a side margin portion disposed on the one or more of the fifth surface and the sixth surface of the active portion to cover at least one of a portion of the first internal electrode and a portion of the second internal electrode.

34. The multilayer capacitor of claim 33, wherein the second external electrode extends to cover a portion of one or more of the first and second surfaces of the active portion.

35. The multilayer capacitor of claim 34, wherein the second external electrode extends continuously from the fifth surface to the sixth surface of the body to cover the portion of the one or more of the first and second surfaces of the active portion.

36. The multilayer capacitor of claim 33, wherein dielectric layer and the side margin portion have different average grain sizes.

37. A multilayer capacitor comprising:
an active portion including a dielectric layer and first and second internal electrodes stacked with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction, wherein the first internal electrode extends to the third surface and one or more of the fifth surface and the sixth surface, and the second internal electrode extends to the one or more of the fifth surface and the sixth surface;
a first external electrode disposed on the third surface of the active portion and connected to the first internal electrode;
a connection electrode disposed on the one or more of the fifth surface and the sixth surface of the active portion and connected to the second internal electrode;
a second external electrode disposed on the one or more of the fifth surface and the sixth surface of the active portion and connected to the connection electrode; and
a side margin portion disposed on the one or more of the fifth surface and the sixth surface of the active portion to cover at least one of a portion of the first internal electrode and a portion of the second internal electrode,
wherein the first internal electrode extends to the fourth surface, and
the multilayer capacitor further includes a third external electrode disposed on the fourth surface of the active portion and connected to the first internal electrode.

38. A multilayer capacitor comprising:
an active portion including a dielectric layer and first and second internal electrodes stacked with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction, wherein the first internal electrode extends to the third surface and one or more of the fifth surface and the sixth surface, and the second internal electrode extends to the one or more of the fifth surface and the sixth surface;
a first external electrode disposed on the third surface of the active portion and connected to the first internal electrode;
a connection electrode disposed on the one or more of the fifth surface and the sixth surface of the active portion and connected to the second internal electrode;
a second external electrode disposed on the one or more of the fifth surface and the sixth surface of the active portion and connected to the connection electrode; and
a side margin portion disposed on the one or more of the fifth surface and the sixth surface of the active portion to cover at least one of a portion of the first internal electrode and a portion of the second internal electrode,
wherein the connection electrode extends to cover a portion of one or more of the first and second surfaces of the active portion.

39. The multilayer capacitor of claim 38, wherein the connection electrode extends continuously from the fifth surface to the sixth surface of the body to cover the portion of the one or more of the first and second surfaces of the active portion.

40. A multilayer capacitor comprising:
a body including a dielectric layer and first and second internal electrodes stacked with the dielectric layer interposed therebetween;
a first external electrode disposed on one surface of the body and connected to the first internal electrode;
a connection electrode partially embedded in the body and connected to the second internal electrode;

a second external electrode disposed on the body to connect to the connection electrode; and a third external electrode disposed on another surface of the body opposing the one surface and connected to the first internal electrode, wherein in a direction perpendicular to a direction in which the one surface and the another surface of the body oppose each other, a dimension of a portion of the connection electrode embedded in the body is less than a dimension of another portion of the connection electrode disposed on a surface of the body.

41. The multilayer capacitor of claim 40, wherein the connection electrode extends to cover a portion of one or more of the first and second surfaces of the active portion.

42. The multilayer capacitor of claim 40, wherein the connection electrode extends continuously from the fifth surface to the sixth surface of the body to cover the portion of the one or more of the first and second surfaces of the active portion.

43. The multilayer capacitor of claim 40, wherein the another portion of the connection electrode protrudes from surface of the body and is bent from the portion of the connection electrode embedded in the body.

* * * * *